(12) United States Patent
Seregin et al.

(10) Patent No.: US 11,184,607 B2
(45) Date of Patent: Nov. 23, 2021

(54) SAME PICTURE ORDER COUNT (POC) NUMBERING FOR SCALABILITY SUPPORT

(71) Applicant: QUALCOMM Incorporated, San Diego, CA (US)

(72) Inventors: Vadim Seregin, San Diego, CA (US); Adarsh Krishnan Ramasubramonian, Irvine, CA (US); Muhammed Zeyd Coban, Carlsbad, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/889,601

(22) Filed: Jun. 1, 2020

(65) Prior Publication Data

US 2020/0396445 A1 Dec. 17, 2020

Related U.S. Application Data

(60) Provisional application No. 62/861,281, filed on Jun. 13, 2019, provisional application No. 62/863,804, filed on Jun. 19, 2019.

(51) Int. Cl.
*H04N 19/105* (2014.01)
*H04N 19/46* (2014.01)
(Continued)

(52) U.S. Cl.
CPC ......... *H04N 19/105* (2014.11); *H04N 19/159* (2014.11); *H04N 19/172* (2014.11); *H04N 19/46* (2014.11); *H04N 19/70* (2014.11)

(58) Field of Classification Search
CPC .......... G06K 9/00711; G06K 9/00771; G06K 2009/00738; H04N 7/181; G08B 13/196
(Continued)

(56) References Cited

U.S. PATENT DOCUMENTS

2010/0091884 A1\* 4/2010 Jeon ..................... H04N 19/573
375/240.25
2013/0142257 A1\* 6/2013 Wang .................... H04N 19/50
375/240.12
(Continued)

OTHER PUBLICATIONS

Bross B., et al., "Versatile Video Coding (Draft 4)", 13. JVET Meeting, 20190109-20190118, Marrakech, (The Joint Video Exploration Team of ISO/IEC JTC1/SC29/WG11 and ITU-T SG.16), No. JVET-M1001, Mar. 17, 2019 (Mar. 17, 2019), XP030255166, 298 Pages, Retrieved from the Internet URL: http://phenix.int-evry.fr/jvet/doc_end_user/documents/13_Marrakech/wg11/JVET-M1001-v7.zip JVET-M1001-v7.docx [retrieved on Mar. 17, 2019] Cited in the Application Sections 7.3.4.1, 7.4.5.1, 8.5.2.9.
(Continued)

*Primary Examiner* — Marnie A Matt
(74) *Attorney, Agent, or Firm* — Polsinelli/Qualcomm

(57) ABSTRACT

Techniques are described for video encoding and decoding with same picture or count numbering for scalability support. One example involves obtaining a portion of a picture (e.g., a slice, a block, or other portion) and determining if weighted prediction is enabled for the portion of the picture. When weighted prediction is enabled, a zero value picture order count offset indicating a reference picture from a reference picture can be used, though different portion of the picture (e.g., different slices of a picture) can have different picture order count offset values. The portion of the picture
(Continued)

can then be reconstructed using the reference picture identified by the zero value picture order count offset. Additional embodiments can use weighted prediction flags and different offset value determinations to support scalability or reference pictures in weighted prediction with a different size than the picture being reconstructed.

31 Claims, 7 Drawing Sheets

(51) Int. Cl.
  *H04N 19/172* (2014.01)
  *H04N 19/70* (2014.01)
  *H04N 19/159* (2014.01)

(58) Field of Classification Search
  USPC .................................................. 375/240.02
  See application file for complete search history.

(56) References Cited

U.S. PATENT DOCUMENTS

| | | | | |
|---|---|---|---|---|
| 2014/0079115 A1* | 3/2014 | Strom | ..................... | H04N 19/58 |
| | | | | 375/240.02 |
| 2015/0016505 A1* | 1/2015 | Sjoberg | .................. | H04N 19/46 |
| | | | | 375/240.02 |
| 2015/0358629 A1* | 12/2015 | Choi | ..................... | H04N 19/44 |
| | | | | 375/240.02 |
| 2016/0088306 A1* | 3/2016 | Sjoberg | .................. | H04N 19/44 |
| | | | | 375/240.02 |

OTHER PUBLICATIONS

International Search Report and Written Opinion—PCT/US2020/035700—ISA/EPO—dated Oct. 1, 2020.

Seregin (Qualcomm) V., et al., "AHG17: On Zero Delta POC in Reference Picture Structure", 15, JVET Meeting; 20190703-20190712; Gothenburg; (The Joint Video Exploration Team of ISO/IEC JTC1/SC29/WG11 and ITU-T SG.16), No. JVET-O0244, Jun. 26, 2019 (Jun. 26, 2019), XP030218950, 3 pages, Retrieved from the Internet URL: http://phenix.int-evry.fr/jvet/doc_end_user/documents/15_Gothenburg/wg11/JVET-O0244-v1.zip JVET-O0244.docx [retrieved on Jun. 26, 2019] the whole document.

Sullivan G., et al., "Various Minor Clean-Up Issues," 5, JVT Meeting, Oct. 14, 2002-Oct. 18, 2002; Geneva, CH; (Joint Video Teamof ISO/IEC JTC1/SC29/WG11 and ITU-T SG.16), No. JVT-E123, Oct. 18, 2002 (Oct. 18, 2002), XP030005536, pp. 1-6, paragraph [02. 2]—paragraph [02. 3].

Yin P., et al., "Weighted Prediction in SVC," 16. JVT Meeting, 73. MPEG Meeting, Jul. 24, 2005-Jul. 29, 2005, Poznan, PL; (Joint Video Team of ISO/IEC JTC1/SC29/WG11 and ITU-T SG.16), No. JVT-P064r1, Jul. 23, 2005 (Jul. 23, 2005), XP030006102, pp. 1-10, paragraph [0001].

* cited by examiner

SAME PICTURE ORDER COUNT (POC) NUMBERING FOR SCALABILITY SUPPORT

CROSS-REFERENCES TO RELATED APPLICATIONS

This application claims the benefit of U.S. Provisional Application No. 62/861,281, filed Jun. 13, 2019 and U.S. Provisional Application No. 62/863,804, filed Jun. 19, 2019, which is hereby incorporated by reference, in entirety and for all purposes.

FIELD

This application is related to video coding. More specifically, this application relates to systems, methods, and computer-readable media providing scalability support for video coding systems.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include versatile video coding (VVC), high-efficiency video coding (HEVC), advanced video coding (AVC), moving picture experts group (MPEG) coding, among others. Video coding can utilize prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

Systems and methods are described herein for improved video processing. Digital video data includes large amounts of data to meet the demands of consumers and video providers, which places a burden on communication networks and devices that process and store the video data. Some examples of video processing use video compression techniques with prediction to encode and decode video data efficiently. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

In some examples, the prediction can use a reference frame in a same layer as a frame being analyzed. Such prediction can include copies of the same frame with a different size or resolution. In some such examples, the reference frame can be identified within a reference list, and referenced using a picture order count offset value. For weighted prediction, an example reference frame within the same layer as the frame being encoded or decoded can be referenced with a zero value picture order count offset. In some such examples, when weighted prediction is not used, a picture order count offset value can be interpreted by an encoder or decoder as plus or minus 1 from the signaled value. Such operations improve the efficiency of network and encoding or decoding devices by reducing signaling and providing efficient processing of the operations for identifying and using reference frames.

In one illustrative example, an apparatus for processing video data is provided. The apparatus includes a memory and a processor implemented in circuitry. The processor is configured to obtain at least a portion of a picture included in a bitstream. The processors is also configured to determine, from the bitstream, that weighted prediction is enabled for at least the portion of the picture and, based on the determination that weighted prediction is enabled for at least the portion of the picture, identify a zero value picture order count offset indicating a reference picture from a reference picture list. The processors is also configured to reconstruct at least the portion of the picture using at least a portion of the reference picture identified by the zero value picture order count offset.

In another example, a method of processing video data is provided. The method includes obtaining, from a bitstream, at least a portion of a picture. The method further includes determining from the bitstream, that weighted prediction is enabled for the portion of the picture. The method further includes, based on the determination that weighted prediction is enabled for the portion of the picture, identifying a zero value picture order count offset indicating a reference picture from a reference picture list. The method further includes reconstructing at least the portion of the picture using at least a portion of the reference picture identified by the zero value picture order count offset.

In another example, a computer-readable storage medium storing instructions that when executed cause one or more processors of a device for decoding video data to: obtain at least a portion of a picture included in a bitstream; determine, from the bitstream, that weighted prediction is enabled for at least the portion of the picture; based on the determination that weighted prediction is enabled for at least the portion of the picture, identify a zero value picture order count offset indicating a reference picture from a reference picture list; and reconstruct at least the portion of the picture using at least a portion of the reference picture identified by the zero value picture order count offset.

In another example, an apparatus for decoding video data is provided. The apparatus includes: means for obtaining at least a portion of a picture included in a bitstream; means for determining, from the bitstream, that weighted prediction is enabled for at least the portion of the picture; based on the determination that weighted prediction is enabled for at least the portion of the picture, means for identifying a zero value picture order count offset indicating a reference picture from a reference picture list; and means for reconstructing at least the portion of the picture using at least a portion of the reference picture identified by the zero value picture order count offset.

In some cases, the method, apparatuses, and computer-readable storage medium described above include: obtaining, from the bitstream, a plurality of portions of the picture, the plurality of portions including at least the portion of the picture reconstructed using the reference picture identified by the zero value picture order count offset; identifying a plurality of corresponding picture order count offsets for the plurality of portions of the picture, wherein the zero value picture order count offset is a corresponding picture order count offset of the plurality of corresponding picture order count offsets associated with the reference picture; and reconstructing the picture using a plurality of reference pictures identified by the plurality of corresponding picture order count offsets.

In some cases, the method, apparatuses, and computer-readable storage medium described above include determining that weighted prediction is enabled by parsing the bitstream to identify one or more weighted prediction flags for the picture. In some cases, the one or more weighted prediction flags for the portion of the picture comprises a sequence parameter set weighted prediction flag and a picture parameter set weighted prediction flag. In some cases, the sequence parameter set weighted prediction flag and the picture parameter set weighted prediction flag are flags for uni-directional predicted frames. In some cases, the sequence parameter set weighted prediction flag and the picture parameter set weighted prediction flag are flags for bi-directional predictive frames. In some cases, the picture parameter set weighted prediction flag is constrained by the sequence parameter set weighted prediction flag.

In some cases, the method, apparatuses, and computer-readable storage medium described above include: obtaining at least a portion a second picture included in the bitstream; determining, from the bitstream, that weighted prediction is disabled for the portion of the second picture; and based on the determination that weighted prediction is disabled for at least the portion of the second picture, determining that a second zero value picture order count offset is not allowed as indicating a second reference picture from the reference picture list for the portion of the second picture.

In some cases, the method, apparatuses, and computer-readable storage medium described above include: based on the determination that the second zero value picture order count offset is not allowed, parsing a syntax element of the bitstream that indicates a picture order count offset for a second reference picture by reconstructing a value of the syntax element as a signaled value plus 1 based on the weighted prediction being disabled for the second picture; and reconstructing the second picture using the reconstructed value of the syntax element.

In some cases, a value of a reference picture syntax element specifies an absolute difference between a picture order count value of the second picture and a previous reference picture entry in the reference picture list for the second reference picture as value plus one when weighted prediction is disabled.

In some cases, the reference picture is associated with a first set of weights and the picture is associated with a second set of weights different than the first set of weights. In some cases, the reference picture has a different size than the picture. In some cases, the reference picture is signaled as a short-term reference picture with a picture order count least significant bit value equal to zero. In some cases, the picture is a non-instantaneous decoding refresh (non-IDR) picture. In some cases, at least the portion of the picture is a slice. The slice can include a plurality of blocks of a picture. In some cases, at least the portion of picture is a block of a picture (e.g., a coding tree unit (CTU), a macro-block, a coding unit or block, a prediction unit or block, or other type of block of a picture).

In some cases, the method, apparatuses, and computer-readable storage medium described above include determining from the bitstream, a layer identifier for the reference picture indicating a layer of a layer index for inter-layer prediction. In some examples, the zero value picture order count offset is identified by inferring a zero value from a picture order count for the reference picture not being signaled when the layer identifier is different than a current layer identifier.

In another illustrative example, an apparatus for encoding video data is provided. The example apparatus includes a memory and a processor implemented in circuitry and configured to identify at least a portion of a picture. The processor is further configured to select weighted prediction as enabled for the portion of the picture. The processor is further configured to identify a reference picture for the portion of the picture and to generate a zero value picture order count offset indicating the reference picture from a reference picture list. The processor is further configured to generate a bitstream, the bitstream comprising the portion of the picture and the zero value picture order count offset as associated with the portion of the picture.

In another example, a method for encoding video data is provided. The method includes identifying at least a portion of a picture. The method includes determining that weighted prediction is selected as enabled for the portion of the picture. The method includes identifying a reference picture for the portion of the picture, and generating a zero value picture order count offset indicating the reference picture from a reference picture list. The method further includes generating a bitstream, where the bitstream comprising the portion of the picture and the zero value picture order count offset as associated with the portion of the picture.

In another illustrative example, a computer-readable storage medium storing instructions that when executed cause one or more processors of a device for encoding video data to: identify at least a portion of a picture; select weighted prediction as enabled for the portion of the picture; identify a reference picture for the portion of the picture; generate a zero value picture order count offset indicating the reference picture from a reference picture list; and generate a bitstream, the bitstream comprising the portion of the picture and the zero value picture order count offset as associated with the portion of the picture.

In another illustrative example, an apparatus for encoding video data is provided. The apparatus includes: means for identifying at least a portion of a picture; means for selecting weighted prediction as enabled for the portion of the picture; means for identifying a reference picture for the portion of the picture; means for generating a zero value picture order count offset indicating the reference picture from a reference picture list; and means for generating a bitstream, the bitstream comprising the portion of the picture and the zero value picture order count offset as associated with the portion of the picture.

In another example, a method for encoding video data is provided. The method includes identifying at least a portion of a picture. The method includes determining that weighted prediction is selected as enabled for the portion of the picture. The method includes identifying a reference picture for the portion of the picture, and generating a zero value picture order count offset indicating the reference picture from a reference picture list. The method further includes generating a bitstream, where the bitstream comprising the portion of the picture and the zero value picture order count offset as associated with the portion of the picture.

In some aspects, the apparatus for decoding video data and/or the apparatus for encoding video data comprises a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus for decoding video data and/or the apparatus for encoding video data includes a camera or multiple cameras for capturing one or more images. In some aspects, the apparatus for decoding video data and/or the apparatus for encoding video data includes a display for displaying one or more images, notifications, and/or other displayable data.

The above-described aspects relating to any of the methods, apparatuses, and computer-readable media can be used individually or in any suitable combination.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
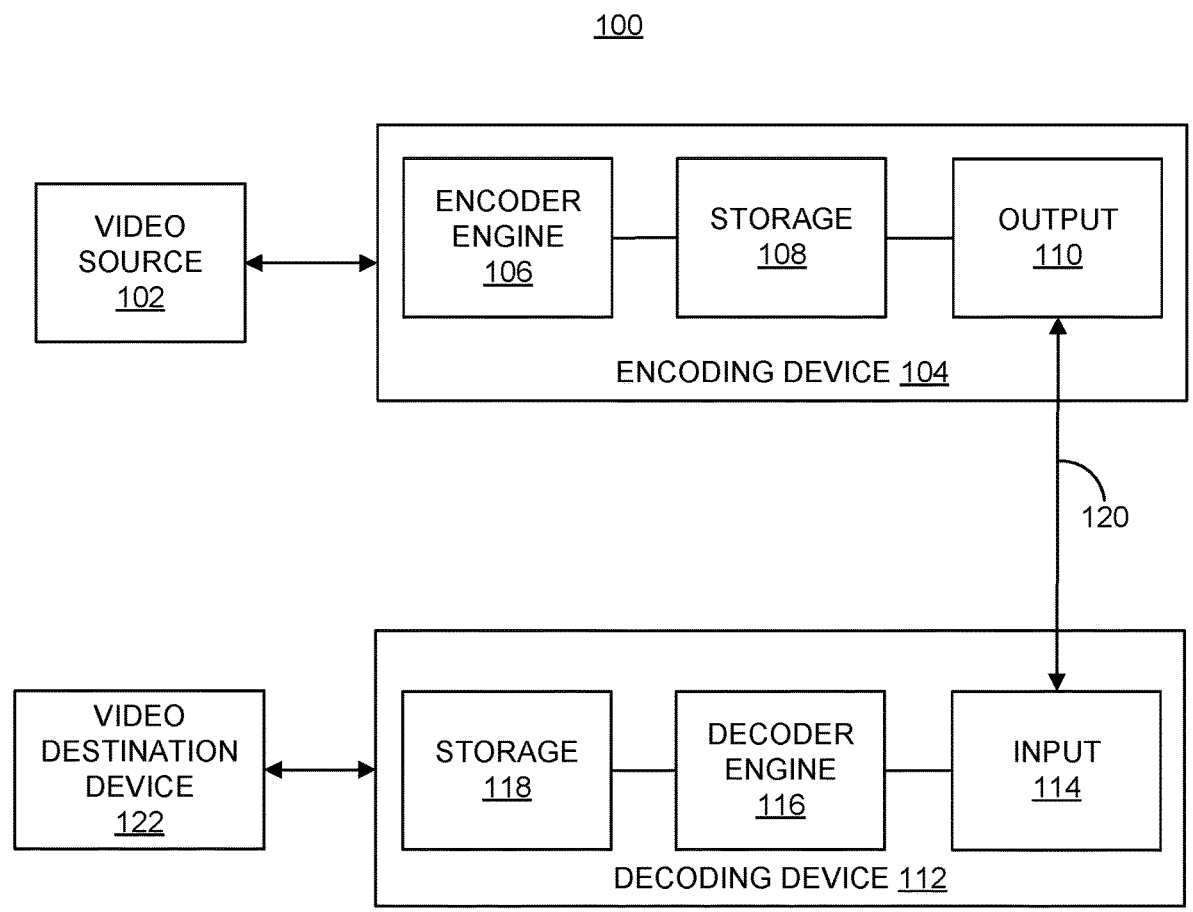
FIG. 1 is a block diagram illustrating an example of an encoding device and a decoding device, in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of examples of the application. However, it will be apparent that various examples may be practiced without these specific details. The figures and description are not intended to be restrictive.

The ensuing description provides exemplary examples only, and is not intended to limit the scope, applicability, or configuration of the disclosure. Rather, the ensuing description of the exemplary examples will provide those skilled in the art with an enabling description for implementing an exemplary example. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder can restrict the search to a certain spatial displacement from the block to be encoded. In some systems, a best match is located using a two-dimensional (2D) motion vector that includes a horizontal displacement component and a vertical displacement component. For intra-prediction modes, a video encoder can form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder can also apply a transform to the prediction error (e.g., a discrete cosine transform (DCT) or other suitable transform) to generate transform coefficients. After transformation, the video encoder may quantize the transform coefficients. In some examples, the quantized transform coefficients and motion vectors are represented using syntax elements, and, along with control information, form a coded representation of a video sequence. In some instances, the video encoder may entropy code syntax elements, thereby further reducing the number of bits for their representation.

A video decoder can, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

As noted above, reference pictures can be used when performing inter-prediction. To identify reference pictures, a picture order count (POC) offset value or "delta POC" value can be used. A POC value identifies a selected picture based on a difference (e.g., an offset or delta) between a picture order count value for the selected picture and a picture order count value for a previous picture or an original picture. Some reference pictures can have a delta POC value equal to zero, such as when multiple reference pictures have the same POC value (e.g., the same picture is used as a reference multiple times). For instance, a zero delta POC value can be used with weighted prediction. In some examples however, when weighted prediction is disabled, zero delta POC values may not be used. Signaling non-zero delta POC values uses additional bits, which can waste resources when the delta POC value is regularly the same non-zero value.

Systems and techniques are described herein that can reduce the bitrate used to signal encoded video data by determining when relevant modes (e.g., weighted prediction) are enabled or disabled, and interpreting the signaled delta POC value based on this determination. In some examples, flags are used to determine a current mode, such as a weighted prediction flag indicating weighted prediction is enabled. In such an example, when weighted prediction is enabled, a signaled delta POC value of zero can be used as the actual delta POC to reconstruct a picture. When weighted prediction is disabled, a signaled delta POC of zero can be modified to determine an actual (non-zero) delta POC value. As described above, such implementations can improve the operation of a system by reducing the bitrate used for image signaling without reducing image quality.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, Versatile Video Coding (VVC), the joint exploration model (JEM), and/or other video coding standard in development or to be developed. While examples described herein provide examples using the JEM model, VVC, the HEVC standard, and/or extensions thereof, the techniques and systems described herein may also be applicable to other coding standards. Accordingly, while the techniques and systems described herein may be described with reference to a particular video coding standard, one of ordinary skill in the art will appreciate that the description should not be interpreted to apply only to that particular standard.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and HEVC or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). A new video coding standard being developed by a joint exploration video team (JVET) is called Versatile Video Coding (VVC).

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures. Pictures may also be referred to as "frames." A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. A pixel can refer to a location within a picture that includes a luma component, a Cb component, and a Cr component. In other instances, a picture may be monochrome and may only include an array of luma samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. An AU includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header.

The encoder engine 106 generates coded representations of pictures by partitioning each picture into multiple slices. A slice is independent of other slices so that information in the slice is coded without dependency on data from other slices within the same picture. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape.

According to the HEVC standard, transformations may be performed using TUs as described above. TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). The decision whether to code a picture area using inter-picture or intra-picture prediction may be made, for example, at the CU level.

Intra-picture prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, a directional prediction to extrapolate from neighboring data, or any other suitable types of prediction.

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $\Delta y_0$, $refIdx_0$ and $\Delta x_1$, $\Delta y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $\Delta_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some examples following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In VVC, a picture can be partitioned into slices, tiles, and bricks. In general, a brick can be a rectangular region of CTU rows within a particular tile in a picture. A tile can be a rectangular region of CTUs within a particular tile column and a particular tile row in a picture. A tile column is a rectangular region of CTUs having a height equal to the height of the picture and a width specified by syntax elements in the picture parameter set. A tile row is a rectangular region of CTUs having a height specified by syntax elements in the picture parameter set and a width equal to the width of the picture. In some cases, a tile may be partitioned into multiple bricks, each of which can include one or more CTU rows within the tile. A tile that is not partitioned into multiple bricks is also referred to as a brick. However, a brick that is a true subset of a tile is not referred to as a tile. A slice can be an integer number of bricks of a picture that are exclusively contained in a single NAL unit. In some cases, a slice can include either a number of complete tiles or only a consecutive sequence of complete bricks of one tile.

The input 114 of the decoding device 112 receives the encoded video bitstream data and may provide the video bitstream data to the decoder engine 116, or to storage 118 for later use by the decoder engine 116. The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

An example of specific details of the encoding device 104 is described below with reference to FIG. 6. An example of specific details of the decoding device 112 is described below with reference to FIG. 7.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some examples, the VPS, SPS, or PPS may be transmitted in-band with the encoded bitstream. In some examples, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not used by the decoding process. For example, the information in an SEI message may not be essential for the decoder to decode the video pictures of the bitstream, but the decoder can be use the information to improve the display or processing of the pictures (e.g., the decoded output).

As described herein, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0 or L0) and reference picture list 1 (RefPicList1 or L1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

For motion prediction in HEVC, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the reference list.

In examples where a MV candidate list is used for motion prediction of a block, the reference list may be constructed by the encoding device and the decoding device separately. For instance, the candidate list can be generated by an encoding device when encoding a block (e.g., a CTU, a CU, or other block of a picture), and can be generated by a decoding device when decoding the block. Information related to motion information candidates in the candidate list, can be signaled between the encoding device and the decoding device. For example, in the merge mode, index values to the stored motion information candidates can be signaled from an encoding device to a decoding device (e.g., in a syntax structure, such as the PPS, SPS, VPS, a slice header, an SEI message sent in or separately from the video bitstream, and/or other signaling). The decoding device can construct a candidate list and use the signaled references or indexes to obtain one or more motion information candidates from the constructed candidate list to use for motion compensation prediction. For example, the decoding device 112 may construct a MV candidate list and use a motion vector from an indexed location for motion prediction of the block. In the case of AMVP mode, in addition to the references or indexes, differences or residual values may also be signaled as deltas. For example, for the AMVP mode, the decoding device can construct one or more MV candidate lists and apply the delta values to one or more motion information candidates obtained using the signaled index values in performing motion compensation prediction of the block.

In some examples, the MV candidate list contains up to five candidates for the merge mode and two candidates for the AMVP mode. In other examples, different numbers of candidates can be included in a candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an index to the candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks. In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder and/or a decoder. In some instances, for single direction inter-prediction of a PU, the encoder and/or decoder can generate a single AMVP candidate list. In some instances, for bi-directional prediction of a PU, the encoder and/or decoder can generate two AMVP candidate lists, one using motion data of spatial and temporal neighboring PUs from the forward prediction direction and one using motion data of spatial and temporal neighboring PUs from the backward prediction direction.

In VVC, there is a reference picture resampling (RPR) tool under consideration, which is described in S. Wenger, B D. Choi, S. C. Han, X. Li, S. Liu, "AHG8: Spatial Scalability using Reference Picture Resampling," JVET-O0045, which is hereby incorporated by reference in its entirety and for all purposes. The RPR tool allows the use of reference picture(s) with a picture size that is different from the current picture size. In this case, a picture resampling process is invoked to provide the upsampled or downsampled versions of the picture (e.g., the reference picture) that matches the current picture size. The tool is similar to spatial scalability, for example, that existed in the scalable extension (SHVC) of the H.265/HEVC standard.

Systems, methods, apparatuses, and computer-readable media are described herein that provide several aspects to add support for spatial scalability in VVC using RPR. In some cases, it can be assumed that the pictures having the same content but in different representations (e.g., having different resolutions) have the same picture order count (POC) value (similar to the approach as for example in HEVC and SHVC).

Figure 3:
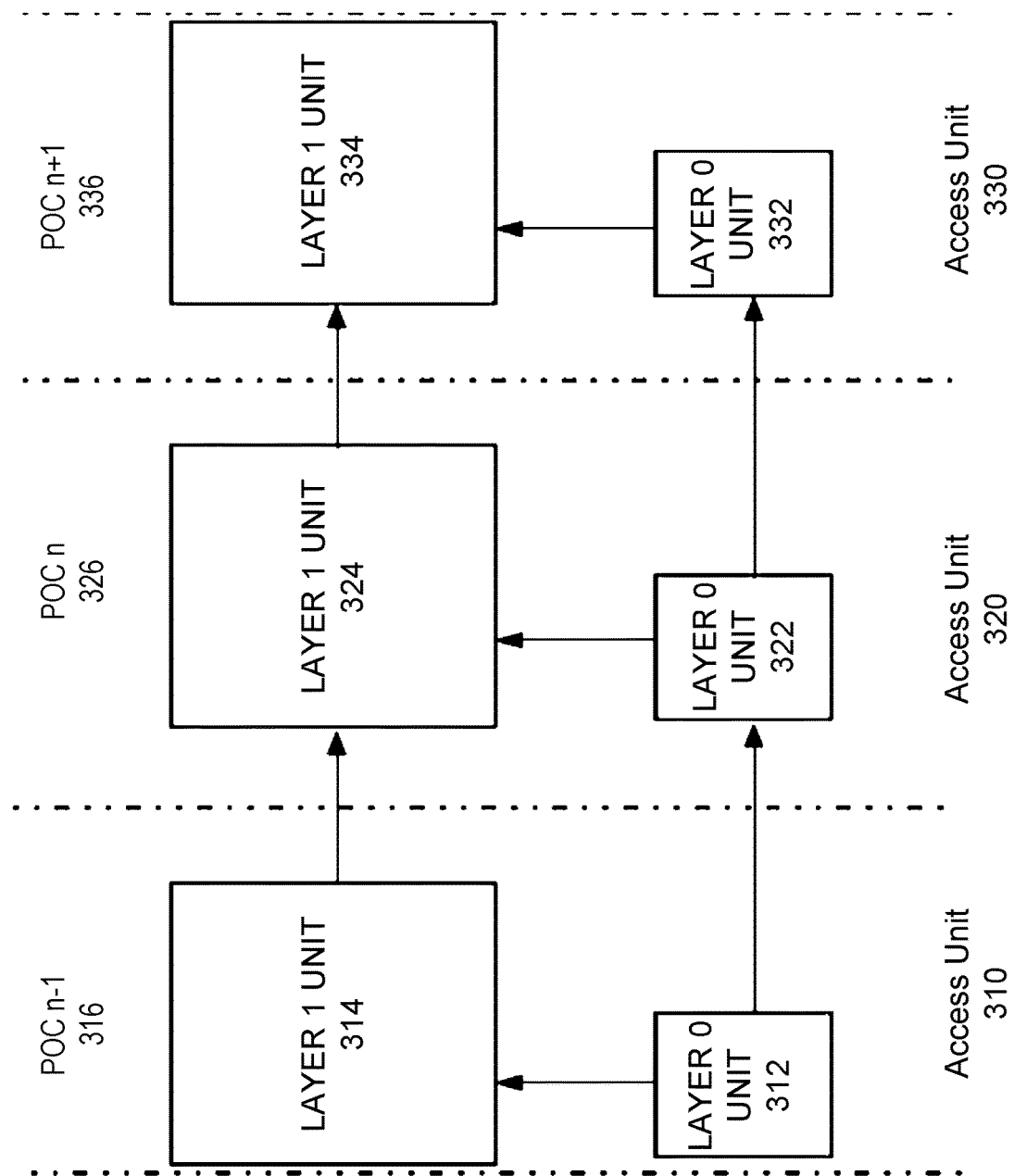
FIG. 3 is a diagram illustrating an example of a plurality of access units (AUs) with different picture order counts (POCs), in accordance with some examples.

Using the techniques described herein, the access unit (AU) definition does not need to be changed in VVC, since an AU starts at a VCL NAL unit with a new POC value (or non-VCL NAL units that are associated with the VCL NAL units with a new POC), which happens when the next picture VCL NAL unit is encountered, as shown in FIG. 3 where a first AU has a POC value of n−1, a second AU has a POC value of n, and a third AU has a POC value of n+1 across two different layers labeled as layer0 and layer1 (e.g., layer0 has lower resolution pictures than layer1).

However, other layer pictures may need to be included into the reference picture structure (RPS) and reference picture list (RPL) to indicate which pictures can be used for inter-layer prediction and from which layer. In the current VVC, pictures from other layers are not allowed to be referenced.

Various examples are provided below with reference to the draft VVC document, such as "Versatile Video Coding (Draft 5)," version 7, JVET-N1001-v7, which is hereby incorporated by reference in its entirety and for all purposes. As noted above, the techniques described herein can be applied to any of the existing video codecs, such as High Efficiency Video Coding (HEVC) and/or Advanced Video Coding (AVC), or can be proposed as a promising coding tool to the standard currently being developed, such as Versatile Video Coding (VVC), and to other future video coding standards.

Figure 2:
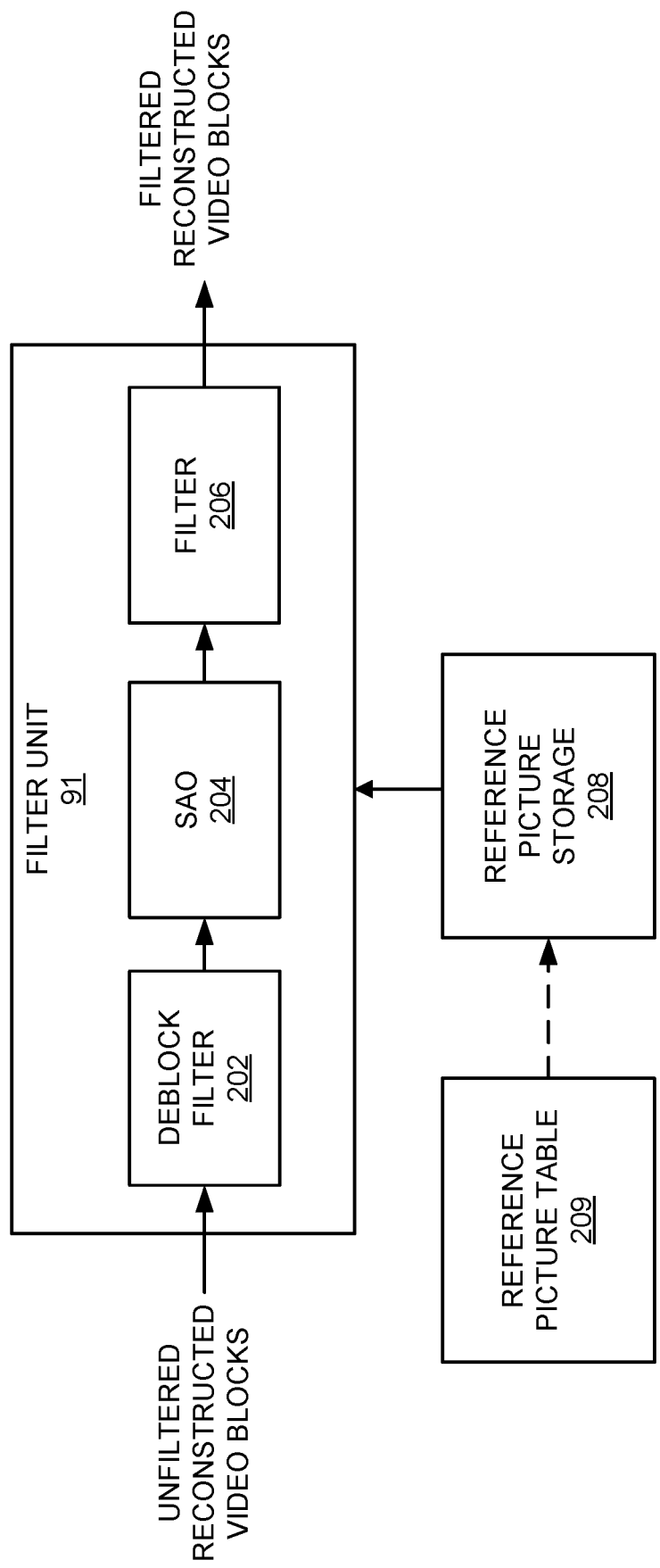
FIG. 2 is a diagram illustrating an example implementation of a filter unit for performing the techniques of this disclosure.

FIG. 2 is a diagram illustrating an example implementation of a filter unit 91 that can be used as described below with respect to FIG. 6 and FIG. 7, including placing reference pictures in a reference picture storage 208 (e.g., such as picture memory 92) that can be identified by reference picture table 209. Additional aspects of reference picture table 209 are discussed below. The filter unit 63 may be implemented in the same manner. The filter units 63 and 91 may use POC numbering and reference picture offset values for scalability support as described herein to enable implementations described herein and other implementations, possibly in conjunction with other components of video encoding device 104 or video decoding device 112.

The filter unit 91 as shown includes a deblocking filter 202, a sample adaptive offset (SAO) filter 204, and a general filter 206, but may include fewer filters and/or may include additional filters than those shown in FIG. 2. Additionally, the particular filters shown in FIG. 2 may be implemented in a different order. Other loop filters (either in the coding loop or after the coding loop) may also be used to smooth pixel transitions or otherwise improve the video quality. When in the coding loop, the decoded video blocks in a given frame or picture are then stored in a decoded picture buffer (DPB), which stores reference pictures as part of reference picture storage 208. The DPB (e.g., reference picture storage 208) may be part of or separate from additional memory that stores decoded video for later presentation on a display device, such as a display of video destination device 122 of FIG. 1.

Weighted Prediction (WP) is a form of prediction using reference pictures in which case a scaling factor (denoted by a), a shift number (denoted by s) and an offset (denoted by b) is used in the motion compensation. For example, a linear model can be used in WP, as illustrated by the following Equation (1):

$$p(i,j)=a*r(i,+dv_x, j+dv_y)+b, \text{ where } (i,j) \in PU_c \qquad \text{Equation (1)}$$

In Equation (1), $PU_c$ is the current PU, (i, j) is the coordinate of samples (or pixels in some cases) in $PU_c$, ($dv_x$, $dv_y$) is the disparity vector of PUG, p(i,j) is the prediction of $PU_c$, r is the PU's reference picture, and a and b are model parameters (where a is the scaling factor and b is the offset, as noted above).

When WP is enabled, for each reference picture of a current slice, a flag is signaled to indicate whether WP applies for the reference picture or not. If WP applies for one reference picture, a set of WP parameters (i.e., a, s and b) is sent to the decoder and is used for motion compensation from the reference picture. In some examples, to provide flexibility in turning on or off WP for luma and chroma samples, the WP flag and WP parameters can be separately signaled for luma and chroma components of a pixel. In some cases, in WP, one same set of WP parameters is used for all samples in one reference picture. In some examples, variables specify a width and height of a current coding block, and arrays with the same width and height are used as prediction samples. A prediction sample can be derived with a weighted sample prediction process, and used in reconstructing a picture.

A picture can include one or more offsets (e.g., offset b), one or more weights or scaling factors (e.g., scaling factor a), a shift number, and/or other suitable weighted prediction parameters. For bi-directional inter-prediction, the one or more weights can include a first weight for the first reference picture and a second weight for the second reference picture. As described herein, in some examples, a reference block can be a same block as a current block, but with different associated weight parameters (e.g., for weighted prediction). In other examples, a reference block can be a block of the same picture but with a different size (e.g., a different resolution), so that the reference block is part of an inter-layer prediction process, as described in more detail with respect to FIG. 3. In some examples, both weighted prediction and inter-layer prediction can be performed on a single current block with a reference block having different weights and associated with a picture of a different size.

FIG. 3 is a diagram illustrating a series of access units 310, 320, and 330. Each access unit has an associated POC value, shown as POC values 316, 326, and 336 corresponding to access units 310, 320, and 330. The access units each have two layers for picture frames with different sizes (e.g., resolutions). The example of FIG. 3 includes layer 0 unit 312 and layer 1 unit 314 for access unit 310, layer 0 unit 322 and layer 1 unit 324 for access unit 320, and layer 0 unit 332 and layer 1 unit 334 for access unit 330. Layer 0 unit 312 (e.g., VCL NAL unit) will have a different size than layer 1 unit 314 (e.g., also a VCL NAL unit). As noted above, using the techniques described herein, the VVC AU definition does not need to be changed, since an AU starts at a VCL NAL unit with a new POC value, or non-VCL NAL units that are associated with the VCL NAL units with a new POC. For example, when the next picture VCL NAL unit is encountered, as shown in FIG. 3 where a first AU has a POC value of n−1, a second AU has a POC value of n, and a third AU has a POC value of n+1 across two different layers labeled as layer0 and layer1 (e.g., layer 0 has lower resolution pictures than layer1), a new POC value can be used. The example of FIG. 3 includes two layers, but in various examples, other numbers of layers can be used.

Examples described herein improve the operation of VVC devices and networks with syntax and operation structures to efficiently allow the use of data from other layers to be used as reference pictures by a picture in a different layer. As described herein, such improvements allow efficient signaling to identify a reference picture in another layer of a shared access unit when weighted prediction is enabled, and allows efficient signaling of reference pictures in other frames using offsets with a zero signaled value when weighted prediction is not enabled.

VVC operates with both short-term and long-term reference pictures. Some examples described here operate with signaling of reference pictures for short-term reference pictures. In various systems, short-term reference pictures are signaled relative to previous short-term reference pictures as a POC delta to the previous reference picture POC. The very first POC value can be initialized to be equal to the current picture POC. The delta POC equal to 0 is allowed (e.g., there could be multiple reference pictures with the same POC value, such as where different resolutions of the same picture are present), but the POC value cannot be equal to the current picture POC (e.g., the current picture cannot be inserted as a reference picture into the reference picture structure or list). In various examples, long term reference picture POC is signaled as most significant bits (MSB) and least significant bits (LSB), and the LSB part can be equal to 0.

In some examples, a table 209 as illustrated in FIG. 2 referring to reference pictures is stored in a DPB (e.g., using memory or reference picture storage 208 as illustrated in FIG. 2). In some examples, this table 209 is a list of picture order count offset values from a current picture or a prior picture that identifies pictures from reference picture storage 208 (e.g., as part of a picture memory such as picture memory 92). In some examples, such a table 209 can be generated in a loop, with an initial table value equal to an initial picture POC value. A base POC value (e.g., a picture order count offset value) is assigned to identify the POC value of the reference picture for the initial picture. The POC value of the first reference picture for the initial picture associated with the initial POC value is assigned as a base POC value for the table. All subsequent reference pictures are then identified as a delta values from the base POC value (e.g., the POC value of the previous reference picture), with delta POC and new base POC values for each entry in the table. This process loops until the table 209 is completed with all reference pictures for each picture associated with the table. As described above, the initial delta POC is added to the first picture POC, and subsequent delta POCs are added to the previous reference picture POC. The bitstream signal is then constructed with the delta POCs and the base POC, to limit data usage in the bitstream while allowing the table 209 to be reconstructed by a decoder. Repetitive reference pictures from the table 209 described above can then be used for prediction. In some examples using weighted prediction, the delta POC for a reference picture and a picture being processed can be zero when the same picture is being used for prediction but with different weights. In some examples, certain types of prediction can use a modified table or modified delta POC values. For example, two pictures with the same POC can have different weights. In one illustrative example, one of the pictures may have a weight with value 1.5 and a reference picture with the same weight valued at 2.5. The same picture with different weighted parameters can thus be used as a reference with a zero value delta POC (also referred to as a "zero value picture order count offset" or "zero value POC offset") identifying the reference picture being used for weighted prediction. In another example, modified delta POC values are used when weighted prediction is disabled. For example, in some cases, weighted prediction may be switched off by a flag, such as a weighted_pred_flag, which may be signaled in the picture parameter set (PPS). The weighted_pred_flag can be referred to as a PPS weighted prediction flag. In some examples, same value POC signaling for more than one reference picture is not allowed when weighted prediction is disabled. To achieve such a restriction or constraint, weighted prediction flags (e.g., sps_weighted_pred_flag and sps_weighted_bipred_flag) can be signaled in a parameter set (e.g., in the SPS since RPS information may be signaled in SPS, or other parameter set). The sps_weighted_pred_flag and/or the sps_weighted_bipred_flag can be referred to as sequence parameter set (SPS) weighted prediction flag(s).

Allowing zero delta POC values when weighted prediction is disabled results in an inefficiency in the delta POC signaling since there is no reason to insert the same reference picture multiple times into the reference picture list. In such case, the delta POC value will be equal at least to 1 and delta POC value 0 is not used. A delta POC value of zero can, however, be associated with a reserved code word in some examples. The use of PPS and SPS flags allows different handling of delta POC signaling in weighted prediction and non-weighted prediction cases described herein. The flags can thus be used to allow zero value picture order count offsets (e.g., zero delta POC values) based on a determination that weighted prediction is enabled for a picture slice (or other portion of a picture, such as a CTU, a CU, or other block), and enable an interpretation of a signaled zero delta POC as a different value (e.g., the signaled value plus 1) when weighted prediction is disabled. For weighted prediction, the same picture with different weights is thus used for weighted prediction. For inter-layer prediction, different layer pictures from the same access unit can then to be used as reference pictures. The conditional use of zero delta POC signaling values provides efficiency in reference picture signaling and improved system and device operation, while limiting additional overhead for signaling and improving system and device performance when weighted prediction is disabled.

For zero value picture order count offsets where a reference picture is in the same access unit as the current picture being processed, a reference picture sampling tool can be used to generate the necessary reference data for processing the current picture. In some examples, this reference picture sampling tool can be part of a filter unit (e.g., filter unit 91), or in other examples can be part of any aspect of a device for encoding or decoding as described herein.

One illustrative example of modifications relative to the VVC draft (e.g., Versatile Video Coding (Draft 5), version 7) for such flags is shown below. Additional examples of syntax tables, syntax terms, syntax logic and values, and other aspects of example implementations are shown below. Where additions are shown, they are described with underlines and text in between "<insert>" and "<insertend>" symbols (e.g., "<insert>added text<insertend>"). One example for weighted prediction flags is as follows:

<insert>sps_weighted_pred_flag equal to 0 specifies that weighted prediction is not applied to P slices. weighted_pred_flag equal to 1 specifies that weighted prediction may be applied to P slices.

sps_weighted_bipred_flag equal to 0 specifies that the default weighted prediction is applied to B slices. weighted_bipred_flag equal to 1 specifies that weighted prediction may be applied to B slices. <insertend>

In such an example, flags signaled in PPS can be constrained by the SPS weighted prediction flags (e.g., the PPS flag can be equal to 1 only when the SPS flag is equal to 1). In another illustrative example:

weighted_pred_flag equal to 0 specifies that weighted prediction is not applied to P slices. weighted_pred_flag equal to 1 specifies that weighted prediction may be applied to P slices; <insert>weighted_pred_flag may be equal to 1 only when the corresponding sps_weighted_pred_flag is equal to 1<insertend>.

weighted_bipred_flag equal to 0 specifies that the default weighted prediction is applied to B slices. weighted_bipred_flag equal to 1 specifies that weighted prediction may be applied to B slices; <insert>weighted_bipred_flag may be equal to 1 only when the corresponding sps_weighted_bipred_flag is equal to 1<insertend>.

In some examples, the delta POC equal to zero and POC LSB equal to zero can be allowed only when weighted prediction is enabled, for example as indicated by the flags in SPS. In another example, the zero delta POC and zero POC LSB are needed when inter-layer prediction is enabled. The enabling of an inter-layer prediction flag can be signaled in a parameter set, such as the SPS. Adding the above two cases together, the delta POC equal to zero and POC LSB equal to zero can be allowed only when weighted prediction or inter-layer prediction is enabled.

In VVC, the POC values of the reference pictures are signaled in the ref_pic_list_struct (RPS), as follows:

TABLE 1

|  | Descriptor |
|---|---|
| ref_pic_list_struct( listIdx, rplsIdx ) { | |
|   num_ref_entries[ listIdx ][ rplsIdx ] | ue(v) |
|   if( long_term_ref_pics_flag ) | |
|     ltrp_in_slice_header_flag[ listIdx ][ rplsIdx ] | u(1) |
|   for( i = 0, j = 0; i < num_ref_entries[ listIdx ][ rplsIdx ]; i++) { | |
|     if( long_term_ref_pics_flag ) | |
|       st_ref_pic_flag[ listIdx ][ rplsIdx ][ i ] | u(1) |
|     if( st_ref_pic_flag[ listIdx ][ rplsIdx ][ i ] ) { | |
|       abs_delta_poc_st[ listIdx ][ rplsIdx ][ i ] | ue(v) |
|       if( abs_delta_poc_st[ listIdx ][ rplsIdx ][ i ] > 0 ) | |
|         strp_entry_sign_flag[ listIdx ][ rplsIdx ][ i ] | u(1) |
|     } else if( !ltrp_in_slice_header_flag[ listIdx ][ rplsIdx ]) | |
|       rpls_poc_lsb_lt [ listIdx ][ rplsIdx ][ j++ ] | u(v) |
|   } | |
| } | |

The syntax example includes:

abs_delta_poc_st[listIdx][rplsIdx][i], when the i-th entry is the first STRP entry in ref_pic_list_struct(listIdx, rplsIdx) syntax structure, specifies the absolute difference between the picture order count values of the current picture and the picture referred to by the i-th entry, or, when the i-th entry is an STRP entry but not the first STRP entry in the ref_pic_list_struct(listIdx, rplsIdx) syntax structure, specifies the absolute difference between the picture order count values of the pictures referred to by the i-th entry and by the previous STRP entry in the ref_pic_list_struct(listIdx, rplsIdx) syntax structure. The value of abs_delta_poc_st[listIdx][rplsIdx][i] shall be in the range of 0 to $2^{15}-1$, inclusive.

rpls_poc_lsb_lt[listIdx][rplsIdx][i] specifies the value of the picture order count modulo MaxPicOrderCntLsb of the picture referred to by the i-th entry in the ref_pic_list_struct(listIdx, rplsIdx) syntax structure. The length of the rpls_poc_lsb_lt[listIdx][rplsIdx][i] syntax element is log2_max_pic_order_cnt_lsb_minus4+4 bits.

In one illustrative implementation example, the syntax elements that can indicate zero delta POC (e.g., identifying a reference picture using a zero value picture order count offset) or the same value POC for a reference picture, such as abs_delta_poc_st and rpls_poc_lsb_lt, cannot be equal to 0 or cannot indicated the same POC value as it was already for other reference pictures when both weighted prediction and inter-layer prediction are disabled. In some examples, the zero delta POC is not allowed when weighted prediction is disabled. In some examples, the zero delta POC is not allowed when inter-layer prediction is disabled.

In another illustrative implementation example, the values of those syntax elements (e.g., the signaled value identifying the reference picture such as a picture order count offset in a bitstream) can be treated as syntax elements minus 1 when both weighted prediction and inter-layer prediction are disabled. In some such examples, the value of the syntax elements are reconstructed as a signaled value plus 1. In such an example, it is not possible for the 0 value to be signaled. One implementation example is shown below:

abs_delta_poc_st[listIdx][rplsIdx][i], when the i-th entry is the first STRP entry in ref_pic_list_struct(listIdx, rplsIdx) syntax structure, specifies the absolute difference between the picture order count values of the current picture and the picture referred to by the i-th entry, or, when the i-th entry is an STRP entry but not the first STRP entry in the ref_pic_list_struct(listIdx, rplsIdx) syntax structure, specifies the absolute difference <insert> or the absolute difference plus 1 when weighted prediction and inter-layer prediction are disabled<insertend>, between the picture order count values of the pictures referred to by the i-th entry and by the previous STRP entry in the ref_pic_list_struct (listIdx, rplsIdx) syntax structure.

The value of abs_delta_poc_st[listIdx][rplsIdx][i] shall be in the range of 0 to $2^{15}-1$, inclusive.

rpls_poc_lsb_lt[listIdx][rplsIdx][i] specifies the value of the picture order count modulo MaxPicOrderCntLsb <insert> or the value of the picture order count modulo MaxPicOrderCntLsb, plus 1, when weighted prediction and inter-layer prediction are disabled<insertend> of the picture referred to by the i-th entry in the ref_pic_list_struct(listIdx, rplsIdx) syntax structure. The length of the rpls_poc_lsb_lt[listIdx][rplsIdx][i] syntax element is log2_max_pic_order_cnt_lsb_minus4+4 bits.

In some examples, it is suggested to add other layer pictures to RPS, but since RPS has only POC values to identify the pictures, the layer ID is signaled additionally for each reference picture.

In another example, to avoid signaling a layer ID for each reference picture, the layer ID is only signaled when the POC value of the reference picture is equal to the POC value of the current picture. If the delta POC relative to the current POC value is equal to 0 (e.g., the reference picture POC is equal to the current picture POC), then the layer ID is signaled to identify the layer. In this example, a picture with a layer ID other than the layer ID of the current picture may be used for prediction only when the picture has the same POC as the current picture (or belongs to the same access unit as the current picture). Furthermore, an inter-layer reference picture may be considered as only being long term reference picture (LTRP), and may be marked as LTRP to avoid motion vector scaling. In this case, layer ID may be signaled only for LTRP type. In another example, layer ID is signaled only for LTRP and when delta POC is equal to 0 or the reference picture has the same POC value as the current picture. In another example, a layer ID can be signaled for a reference picture, or only LTRP, before signaling the POC value of a reference picture. In this case, POC value maybe conditionally signaled based on the signaled layer ID and the current layer ID. For example, POC is not signaled when layer ID is not equal to the current layer ID (e.g., inter-layer reference picture), then POC value is inferred being equal to the current picture POC. In some examples, a layer ID can be the indicator to identify a layer, and can be a layer number, a layer index within the list of the layers, used for prediction, or another indicator.

In accordance with the above syntax table for ref_pic_list_struct shown by table 2, one example can include:

num_ref_entries may include the total number of both regular and inter-layer reference pictures. In one alternative, the number of inter-layer reference pictures num_inter_layer_ref_entries[listIdx][rplsIdx] is signaled separately. A high-level flag, for example, signaled in a parameter set (PS), such as sps_interlayer_ref_pics_present_flag signaled in SPS may indicated whether inter-layer reference pictures are present.

<insert>sps_inter_layer_ref_pics_present_flag equal to 1 specifies that inter-layer prediction may be used in decoding of the pictures that refer to the SPS. Sps_inter_layer_ref_pics_present_flag equal to 0 specifies that inter-layer prediction is not used in decoding of the pictures that refer to the SPS.<insertend>

In some such examples, instead of directly signaling nuh_layer_id, the layer index can be signaled. For example, a layer 10 may use layer 0 and layer 9 as the dependent layers. Instead of signaling values 0 and 9 directly, the layer index 0 (corresponding to layer ID 0) and 1 (corresponding to layer ID 9) can be signaled instead. The mapping between the layer ID and layer index can be inferred or derived at the coder.

In some examples, separate flag il_ref_pic_flag can be signaled as shown below in table 3 to indicate that the picture is for inter-layer prediction. This flag can be signaled for each picture or only for LTRP (e.g., when st_ref_pic_flag is equal to 0). In some such examples, layer ID or layer index can be signaled only when the il_ref_pic_flag is equal to 1. Such flag maybe needed when layer index is signaled, since the current layer ID is not included as a dependent layers and may not have an associated layer index.

TABLE 2

| | Descriptor |
|---|---|
| ref_pic_list_struct( listIdx, rplsIdx ) { | |
|    num_ref_entries[ listIdx ][ rplsIdx ] | ue(v) |
|    <insert>if( sps_interlayer_ref_pics_present_flag ) | |
|       num_inter_layer_ref_entries[ listIdx ][ rplsIdx ]<insertend> | <insert>ue(v)<insertend> |
|    if( long_term_ref_pics_flag ) | |
|       ltrp_in_slice_header_flag[ listIdx ][ rplsIdx ] | u(1) |
|    for( i = 0, j = 0; i < num_ref_entries[ listIdx ][ rplsIdx ] <insert>+ num_inter_layer_ref_entries[ listIdx ][ rplsIdx ]<insertend>; i++) { | |
|       if( long_term_ref_pics_flag ) | |
|          st_ref_pic_flag[ listIdx ][ rplsIdx ][ i ] | u(1) |
|       if( st_ref_pic_flag[ listIdx ][ rplsIdx ][ i ] ) { | |
|          abs_delta_poc_st[ listIdx ][ rplsIdx ][ i ] | ue(v) |
|          if( abs_delta_poc_st[ listIdx ][ rplsIdx ][ i ] > 0 ) | |
|             strp_entry_sign_flag[ listIdx ][ rplsIdx ][ i ] | u(1) |
|       } else if( !ltrp_in_slice_header_flag[ listIdx ][ rplsIdx ]) | |
|          rpls_poc_lsb_lt[ listIdx ][ rplsIdx ][ j ] | u(v) |
|          <insert>if( rpls_poc_lsb_lt[ listIdx ][ rplsIdx ][ j ] == 0 ) | |
|             nuh_layer_id[ listIdx ][ rplsIdx ][ j ]<insertend> | <insert>u(7)<insertend> |
|       j++ | |
|    } | |
| } | |

TABLE 3

| | Descriptor |
|---|---|
| ref_pic_list_struct( listIdx, rplsIdx ) { | |
|     num_ref_entries[ listIdx ][ rplsIdx ] | ue(v) |
|     <insert>if( sps_interlayer_ref_pics_present_flag ) | |
|         num_inter_layer_ref_entries[ listIdx ][ rplsIdx ]<insertend> | <insert>ue(v)<insertend> |
|     if( long_term_ref_pics_flag ) | |
|         ltrp_in_slice_header_flag[ listIdx ][ rplsIdx ] | u(1) |
|     for( i = 0, j = 0; i < num_ref_entries[ listIdx ][ rplsIdx ] <insert>+ num_inter_layer_ref_entries[ listIdx ][ rplsIdx ]<insertend>; i++) { | |
|         if( long_term_ref_pics_flag ) | |
|             st_ref_pic_flag[ listIdx ][ rplsIdx ][ i ] | u(1) |
|         if( st_ref_pic_flag[ listIdx ][ rplsIdx ][ i ] ) { | |
|             abs_delta_poc_st[ listIdx ][ rplsIdx ][ i ] | ue(v) |
|             if( abs_delta_poc_st[ listIdx ][ rplsIdx ][ i ] > 0 ) | |
|                 strp_entry_sign_flag[ listIdx ][ rplsIdx ][ i ] | u(1) |
|         } else if( !ltrp_in_slice_header_flag[ listIdx ][ rplsIdx ]) | |
|             rpls_poc_lsb_lt[ listIdx ][ rplsIdx ][ j ] | u(v) |
|         <insert>if(rpls_poc_lsb_lt[ listIdx ][ rplsIdx ][ j ] = = 0) { | |
|             il_ref_pic_flag[ listIdx ][ rplsIdx ][ i ] | |
|             if( il_ref_pic_flag[ listIdx ][ rplsIdx ][ i ] ) | |
|                 layer_dependency_idc[ listIdx ][ rplsIdx ][ i ] | <insert>ue(v)<insertend> |
|         }<insertend> | |
|         j++ | |
|     } | |
| } | |

Table 4 below then illustrates an example of a syntax table for ref_pic_list_struct with the following details:

<insert>layer_dependency_idc[listIdx][rplsIdx][i] specifies the dependency layer index of the i-th entry in ref_pic_list_struct(listIdx, rplsIdx) syntax structure. The value of layer_dependency_idc[listIdx][rplsIdx][i] shall be in the range of 0 to the current layer idc LayerIdc[nuh_layer_id] minus 1, inclusive.

il_ref_pic_flag[listIdx][rplsIdx][i] equal to 1 specifies that the i-th entry in the ref_pic_list_struct(listIdx, rplsIdx) syntax structure is an inter-layer reference picture. il_ref_pic_flag[listIdx][rplsIdx][i] equal to 0 specifies that the i-th entry in the ref_pic_list_struct(listIdx, rplsIdx) syntax structure is not inter-layer reference picture entry. When not present, the value of il_ref_pic_flag[listIdx][rplsIdx][i] is inferred to be equal to 0.

num_inter_layer_ref_entries[listIdx][rplsIdx] specifies the number of direct inter-layer entries in the ref_pic_list_struct(listIdx, rplsIdx) syntax structure. The value of num_inter_layer_ref_entries[listIdx][rplsIdx] shall be in the range of 0 to sps_max_dec_pic_buffering_minus1+14−num_ref_entries[listIdx][rplsIdx], inclusive. <insertend>

In some such examples, the number of inter-layer reference pictures num_inter_layer_ref_entries can be restricted to not exceed the max number of reference pictures minus the number of regular inter reference pictures, e.g., the value of num_inter_layer_ref_entries[listIdx][rplsIdx] shall be in the range of 0 to sps_max_dec_pic_buffering_minus 1+14−num_ref_entries[listIdx][rplsIdx], inclusive added to the semantics of num_inter_layer_ref_entries. The num_inter_layer_ref_entries syntax element can be referred to as an inter-layer reference picture entry syntax element. The ref_pic_list_struct(listIdx, rplsIdx) syntax structure can be referred to as a reference picture list syntax structure. In some examples, il_ref_pic_flag[ ][ ] is signalled for all long term reference pictures when inter-layer reference pictures are allowed.

TABLE 4

| | Descriptor |
|---|---|
| ref_pic_list_struct( listIdx, rplsIdx ) { | |
|     num_ref_entries[ listIdx ][ rplsIdx ] | ue(v) |
|     <insert>if( sps_interlayer_ref_pics_present_flag ) | |
|         num_inter_layer_ref_entries[ listIdx ][ rplsIdx ] | <insert>ue(v)<insertend> |
|     numILEntries = 0<insertend> | |
|     if( long_term_ref_pics_flag ) | |
|         ltrp_in_slice_header_flag[ listIdx ][ rplsIdx ] | u(1) |
|     for( i = 0, j = 0; i < num_ref_entries[ listIdx ][ rplsIdx ] <insert>+ num_inter_layer_ref_entries[ listIdx ][ rplsIdx ] <insertend>; i++) { | |
|         if( long_term_ref_pics_flag ) | |
|             st_ref_pic_flag[ listIdx ][ rplsIdx ][ i ] | u(1) |
|         if( st_ref_pic_flag[ listIdx ][ rplsIdx ][ i ] ) { | |
|             abs_delta_poc_st[ listIdx ][ rplsIdx ][ i ] | ue(v) |

TABLE 4-continued

| | Descriptor |
|---|---|
|         if( abs_delta_poc_st[ listIdx ][ rplsIdx ][ i ] > 0 ) | |
|             strp_entry_sign_flag[ listIdx ][ rplsIdx ][ i ] | u(1) |
|         } else if( !ltrp_in_slice_header_flag[ listIdx ][ rplsIdx ]) | |
|             rpls_poc_lsb_lt[ listIdx ][ rplsIdx ][ j ] | u(v) |
|         <insert>if( numILEntries < num_inter_layer_ref_entries[ listIdx ][ rplsIdx ] ) { | |
|             il_ref_pic_flag[ listIdx ][ rplsIdx ][ i ] | |
|             if( il_ref_pic_flag[ listIdx ][ rplsIdx ][ i ] ) | |
|                 layer_dependency_idc[ listIdx ][ rplsIdx ][ i ] | <insert>ue(v)<insertend> |
|             numILEntries++ | |
|         }<insertend> | |
|         j++ | |
|     } | |
| } | |

Tables 5 and 6 then illustrate example syntax tables for ref_pic_list_struct and an associated slice header. In such additional examples, the layer information may be signalled in the slice header. This signalling may be in addition to the signalling allowed in the ref_pic_list_struct( ) syntax structure. Such a definition helps in cases where the layer information is signalled only when the LSB of the reference picture is equal to the LSB of the current picture.

TABLE 5

| | Descriptor |
|---|---|
| ref_pic_list_struct( listIdx, rplsIdx ) { | |
|     num_ref_entries[ listIdx ][ rplsIdx ] | ue(v) |
|     <insert>if( sps_interlayer_ref_pics_present_flag ) | |
|         num_inter_layer_ref_entries[ listIdx ][ rplsIdx ]<insertend> | <insert>ue(v)<insertend> |
|     <insert>if( num_inter_layer_ref_entries[ listIdx ][ rplsIdx ] ) | |
|         il_pics_in_slice_header_flag[ listIdx ][ rplsIdx ] | <insert>u(1)<insertend> |
|     numILEntries = 0<insertend> | |
|     if( long_term_ref_pics_flag ) | |
|         ltrp_in_slice_header_flag[ listIdx ][ rplsIdx ] | u(1) |
|     for( i = 0, j = 0; i < num_ref_entries[ listIdx ][ rplsIdx ] <insert>+ num_inter_layer_ref_entries[ listIdx ][ rplsIdx ]<insertend>; i++) { | |
|         if( long_term_ref_pics_flag ) | |
|             st_ref_pic_flag[ listIdx ][ rplsIdx ][ i ] | u(1) |
|         if( st_ref_pic_flag[ listIdx ][ rplsIdx ][ i ] ) { | |
|             abs_delta_poc_st[ listIdx ][ rplsIdx ][ i ] | ue(v) |
|             if( abs_delta_poc_st[ listIdx ][ rplsIdx ][ i ] > 0 ) | |
|                 strp_entry_sign_flag[ listIdx ][ rplsIdx ][ i ] | u(1) |
|         } else if( !ltrp_in_slice_header_flag[ listIdx ][ rplsIdx ] ) | |
|             rpls_poc_lsb_lt[ listIdx ][ rplsIdx ][ j ] | u(v) |
|         <insert>if( !il_pics_in_slice_header_flag[ listIdx ][ rplsIdx ] && numILEntries < num_inter_layer_ref_entries[ listIdx ][ rplsIdx ] ) { | |
|             il_ref_pic_flag[ listIdx ][ rplsIdx ][ i ] | |
|             if( il_ref_pic_flag[ listIdx ][ rplsIdx ][ i ] ) | |
|                 layer_dependency_idc[ listIdx ][ rplsIdx ][ i ] | <insert>ue(v)<insertend> |
|             numILEntries++ | |
|         }<insertend> | |
|         j++ | |
|     } | |
| } | |

TABLE 6

| | Descriptor |
|---|---|
| slice_header( ) { | |
|   slice_pic_parameter_set_id | ue(v) |
|   ... | |
|   if( ( NalUnitType != IDR_W_RADL && NalUnitType != IDR_N_LP ) \|\| | |
|     sps_idr_rpl_present_flag ) { | |
|     for( i = 0; i < 2; i++ ) { | |
|       if( num_ref_pic_lists_in_sps[ i ] > 0 && | |
|         ( i = = 0 \|\| ( i = = 1 && rpl1_idx_present_flag ) ) ) | |
|         ref_pic_list_sps_flag[ i ] | u(1) |
|       if( ref_pic_list_sps_flag[ i ] ) { | |
|         if( num_ref_pic_lists_in_sps[ i ] > 1 && | |
|           ( i = = 0 \|\| ( i = = 1 && rpl1_idx_present_flag ) ) ) | |
|           ref_pic_list_idx[ i ] | u(v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_header_flag[ i ][ RplsIdx[ i ] ] ) | |
|           slice_poc_lsb_lt[ i ][ j ] | u(v) |
|         delta_poc_msb_present_flag[ i ][ j ] | u(1) |
|         if( delta_poc_msb_present_flag[ i ][ j ]) | |
|           delta_poc_msb_cycle_lt[ i ][ j ] | ue(v) |
|         <insert>if( il_pics_in_slice_header_flag[ i ][ RplsIdx[ i ] ] ) { | |
|           il_ref_pic_flag[ listIdx ][ rplsIdx ][ i ] | |
|           if( il_ref_pic_flag[ listIdx ][ rplsIdx ][ i ] ) | |
|             layer_dependency_idc[ listIdx ][ rplsIdx ][ i ]<insertend> | <insert>ue(v)<insertend> |
|       } | |
|     } | |
|   } | |
|   if( ( slice_type != I && num_ref_entries[ 0 ][ RplsIdx[ 0 ] ] > 1 ) \|\| | |
|     ( slice type = = B && num_ref_entries[ 1 ][ RplsIdx[ 1 ] ] > 1 ) ) { | |
|     num_ref_idx_active_override_flag | u(1) |
|     if( num_ref_idx_active_override_flag ) | |
|       for( i = 0; i < ( slice_type = = B ? 2: 1 ); i++ ) | |
|         if( num_ref_entries[ i ][ RplsIdx[ i ] ] > 1 ) | |
|           num_ref_idx_active_minus1[ i ] | ue(v) |
|   } | |
| } | |
| if( partition_constraints_override_enabled_flag) { | |
|   ... | ue(v) |

In other embodiments as described by table 7, il_ref_pic_flag[ ][ ] in the slice header is only signalled when POC LSB of the long term reference picture is equal to the POC LSB of the current picture. In some examples, rpls_poc_lsb_lt may also be used.

TABLE 7

| ... | |
|---|---|
| <insert>if( il_pics_in_slice_header_flag[ i ][ RplsIdx[ i ] ] && slice_poc_lsb_lt[ i ][ j ] = = slice_pic_order_cnt_lsb) { | |
|   il_ref_pic_flag[ listIdx ][ rplsIdx ][ i ] | |
|   if( il_ref_pic_flag[ listIdx ][ rplsIdx ][ i ] ) | |
|     layer_dependency_idc[ listIdx ][ rplsIdx ][ i ]<insertend> | <insertend>ue(v)<insertend> |
| ... | |

In some examples, table 8 below can operate as an alternative to the examples of tables 6 and 7 above:

TABLE 8

```
...
    <insert>if( il_pics in_slice_header_flag[ i ][ RplsIdx[ i ] ] &&
slice_pic_order_cnt_lsb = =
    ( ltrp_in_slice_header_flag[ i ][ RplsIdx[ i ] ] ? slice_poc_lsb_lt[ i ][ j ]
        : rpls_poc_lsb_lt[ i ][ j ] ) )
```

TABLE 8-continued

```
{
        il_ref_pic_flag[ listIdx ][ rplsIdx ][ i ]
        if( il_ref_pic_flag[ listIdx ][ rplsIdx ][ i ] )
            layer_dependency_idc[ listIdx ][ rplsIdx ][ i ]<insertend>    <insert>ue(v)<insertend>
...
}
```

In some examples, in cases where the indication of layer_depdendency_idc is not necessary to identify the inter-layer reference picture, the layer_depdendency_idc syntax element may not be sent. In some examples, if there is only one inter-layer reference picture that may be used for reference and il_ref_pic_flag[ ][ ][ ] indicates that a reference picture may be used for a reference that satisfies conditionA (e.g., as defined below), the layer_dependency_idc is not signalled and inferred to be that inter-layer reference picture that may be used for reference. In some cases, when there are more than one inter-layer reference picture that may be used for reference that satisfy conditionA, (e.g., n in number), signalling not more than n-1 layer_dependency_idc values to indicate the particular inter-layer reference picture for the i-the position in the list can be sufficient. In such examples, the conditionA could be any condition that allows inter-layer prediction for the current picture. For example in some cases, conditionA checks that the inter layer reference picture shares the same POC LSB as the current picture. In some cases, conditionA checks that the inter layer reference picture shares the same POC as the current picture. In some cases, conditionA checks that the difference between the POC of the inter-layer reference picture and the POC of the current picture does not exceed a threshold value. In some cases, the conditionA may be restricted to be applied within an access unit. In some examples, when no picture that satisfies conditionA exists for the current picture, indication of inter-layer reference pictures (e.g., related syntax elements) may not be signalled.

In some instances, when a reference picture is indicated as an inter-layer reference picture (e.g., using il_ref_pic_flag[ ] or similar syntax), the picture marking may be modified to indicate those pictures as "used for inter-layer reference picture". In some cases, this marking can be in conjunction with other marking (e.g., used for short-term reference or used for long-term reference) or exclusive of other marking (e.g., a picture may only be marked as two of the following: used for short-term reference or used for long-term reference or used for inter-layer reference picture.). In some cases, the marking of a picture may be modified as follows:

After a picture is decoded, it is marked as "used for inter-layer reference".

After an access unit is complete, or at the beginning the next access unit, all pictures in the current access unit are marked as used for short-term reference.

In some cases, a discardable_flag may be signaled to indicate that a picture may not be used for inter-layer reference. In this case, some modifications may apply to some of the methods disclosed above. In one example, a picture that has discardable_flag equal to 1 may be marked as "unused for reference" after the decoding of the picture. In another example, a picture that has discardable_flag equal to 1 may never be marked anything other than "unused for reference". In another example, a picture that has discardable_flag equal to 1 may not be considered for any prediction; therefore, it may not be considered in the determination of certain conditions that may otherwise apply to inter-layer reference pictures or reference pictures, in general. For instance, if there are two pictures A and B in difference layers than the current picture in the current access unit, and only one of them (e.g., picture A) has discardable_flag equal to 1, then when inter-layer reference picture is indicated, a system can infer that the inter-layer reference picture is picture B, in which case picture A is not added to any of the reference picture lists.

The mapping table mentioned above (e.g., vps_direct_dependency_flag[i][j]) can be signaled, for example, in a parameter set, such as VPS as shown in example table 10.

TABLE 10

```
for( i = 0; i <= vps_max_layers_minus1; i++ ) {
    vps_included_layer_id[ i ]                              u(7)
    <insert>if( i > 0 ) {                                   u(1)
        vps_independent_layer_flag[ i ]
        if(!vps_independent_layer_flag[ i ])
            for( j = 0; j < i; j++ )
                vps_direct_dependency_flag[ i ][ji ]        <insert>u(1)<insertend>
    }<insertend>
    vps_reserved_zero_bit                                   u(1)
}
```

The example table 10 can operate with syntax elements as follows:

```
<insert>The variable LayerIdc[ i ][ j ] is derived as follows:
for( i = 0, j = 0; i <= vps_max_layers_minus1; i++, j++ ) {
    LayerIdc[ vps_included_layer_id[ i ] ][ j ] = j
}
``` vps_independent_layer_flag[i] equal to 1 specifies that the layer with index i does not use inter-layer prediction. vps_independent_layer_flag[i] equal to 1 specifies that the layer with index i may use inter-layer prediction and vps_layer_dependency_flag is present in VPS.

vps_direct_dependency_flag[i][j] equal to 0 specifies that the layer with index j is not a direct reference layer for the layer with index i. vps_direct_dependency_flag[i][j] equal to 1 specifies that the layer with index j is a direct reference layer for the layer with index i. When vps_direct_dependency_flag[i][j] is not present for i and j in the range of 0 to MaxLayersMinus1, it is inferred to be equal to 0.

The variable DependencyIdc[i][j] is derived as follows:

```
for( i = 1; i <= MaxLayersMinus1; i-- )
    if( !vps_independent_layer_flag[i] )
        for( j = MaxLayersMinus1-1, k = 0; j >= 0; j-- )
            if( vps_direct_dependency_flag[ i ][ j ] )
                DependencyIdc[ i ][ k++ ] = j<insertend>
```

In a reference picture list in accordance with some examples, when a POC value is not signaled (e.g., when a layer ID is not equal to a current layer ID, such as for an inter-layer reference picture), the POC value is inferred to be equal to a current picture POC. A layer ID is an indicator to identify a layer, and can be a layer index within a list of layers used for prediction. In other examples, other indicators can be used. Num_ref_entries can include a total number of both regular and inter-layer reference pictures. In some examples, a separate reference flag can be signaled to indicate that the picture is for inter layer prediction in various examples, and this flag can be signaled for each reference picture.

In some examples, an inter-layer reference picture is not indicated by a POC value. In such examples, the inter-layer reference picture can be indicated by a flag (e.g., an inter_layer_ref_pic_flag) and a layer index. A POC value of an inter-layer reference picture can be derived as equal to the current picture POC as per a condition that there is a reference picture in a DPB with nuh_layer_id equal to a reference picture layer ID and a same picture order count value as a current picture. Thus, as described above, reference picture list construction can be structured for signal inter-layer prediction in some examples with a layer ID and an inferred POC value of 0. In other examples, other reference picture list structures can be used.

In some such examples, reference picture lists RefPicList [0] and RefPicList[1] are constructed as follows:

In some cases, if nuh_layer_id[i][RplsIdx[i]][j] is not directly signaled, it can be derived from the LayerIdc and DependencyIdc variables using layer_dependency_idc. For example, nuh_layer_id[listIdx][rplsIdx][j]=DependencyIdc [LayerIdc[nuh_layer_id]][layer_dependency_idc[listIdx][rplsIdx][j]], where nuh_layer_id is the layer ID of the current picture. This value can be used as a layer ID in the reference picture list derivation.

In some cases, a constraint can be added that when inter-layer reference picture is signaled in an RPS, the POC value of the inter-layer reference picture derived from RPS shall be equal to the POC value of the current picture. When inter-layer prediction is used, the zero-motion vector may be assumed, in which case there is no displacement of the content in the pictures of the different representation (resolution). The motion information can be signaled for inter-prediction mode. To save overhead, the motion information can be signaled when (in some cases, only when) it is not used for inter-layer prediction. Otherwise (if inter-layer prediction) motion vector is inferred equal to 0 without signaling.

Table 11 is an implementation example based on VVC draft (e.g., Versatile Video Coding (Draft 5), version 7) with

```
for( i = 0; i < 2; i++ ) {
    for( j = 0, k = 0, pocBase = PicOrderCntVal; j < num_ref_entries[ i ][ RplsIdx[ i ] ]
<insert>+ num_inter_layer_ref_entries[ i ][ RplsIdx[ i ] ]<insertend>; j++) {
        if( st_ref_pic_flag[ i ][ RplsIdx[ i ] ][ j ] ) {
            RefPicPocList[ i ][ j ] = pocBase − DeltaPocSt[ i ][ RplsIdx[ i ] ][ j ]
            if( there is a reference picture picA in the DPB with the same NuhLayerId as
the current picture and
                    PicOrderCntVal equal to RefPicPocList[ i ][ j ] )
                RefPicList[ i ][ j ] = picA
            else
                RefPicList[ i ][ j ] = "no reference
picture"            (8-5)
            pocBase = RefPicPocList[ i ][ j ]
        } else {
            if( !delta_poc_msb_cycle_lt[ i ][ k ] ) {
                if( there is a reference picA in the DPB with <insert>the NuhLayerId equal
to the nuh_layer_id[ i ][ RplsIdx[ i ] ][ j ]<insertend> and
                        PicOrderCntVal & ( MaxPicOrderCntLsb − 1 ) equal to
PocLsbLt[ i ][ k ] )
                    RefPicList[ i ][ j ] = picA
                else
                    RefPicList[ i ][ j ] = "no reference picture"
            } else {
                if( there is a reference picA in the DPB with <insert>the NuhLayerId equal
to the nuh_layer_id[ i ][ RplsIdx[ i ] ][ j ]<insertend> and PicOrderCntVal equal to
FullPocLt[ i ][ k ] )
                    RefPicList[ i ][ j ] = picA
                else
                    RefPicList[ i ][ j ] = "no reference picture"
            }
            k++
        }
    }
}
``` changes in coding_unit(x0, y0, cbWidth, cbHeight, treeType) as shown below:

TABLE 11

```
        if( NumRefIdxActive[ 0 ] <insert>+ NumInterLayerActive[ 0 ] >
1<insertend> && !sym_mvd_flag[ x0 ][ y0 ] )
                ref_idx_l0[ x0 ][ y0 ]                                          ae(v)
            <insert>if( ref_idx_l0[ x0 ][ y0 ] < NumRefIdxActive[ 0 ] )
{ <insertend>
                mvd_coding( x0, y0, 0, 0 )
                if( MotionModelIdc[ x0 ][ y0 ] > 0 )
                    mvd_coding( x0, y0, 0, 1 )
                if(MotionModelIdc[ x0 ][ y0 ] > 1 )
                    mvd_coding( x0, y0, 0, 2 )
                mvp_l0_flag[ x0 ][ y0 ]                                         ae(v)
            <insert>} else {
                MvdL0[ x0 ][ y0 ][ 0 ] = 0
                MvdL0[ x0 ][ y0 ][ 1 ] = 0
            }<insertend>
        } else {
            MvdL0[ x0 ][ y0 ][ 0 ] = 0
            MvdL0[ x0 ][ y0 ][ 1 ] = 0
        }
        if( inter_pred_idc[ x0 ][ y0 ] != PRED_L0 ) {
            if( NumRefIdxActive[ 1 ] <insert>+ NumInterLayerActive[ 1 ] >
1<insertend> && !sym_mvd_flag[ x0 ][ y0 ] )
                ref_idx_l1[ x0 ][ y0 ]                                          ae(v)
            <insert>if( ref_idx_l1[ x0 ][ y0 ] < NumRefIdxActive[ 1 ] )
{<insertend>
                if( mvd_l1_zero_flag && inter_pred_idc[ x0 ][ y0 ] = = PRED_BI )
{
                    MvdL1[ x0 ][ y0 ][ 0 ] = 0
                    MvdL1[ x0 ][ y0 ][ 1 ] = 0
                    MvdCpL1[ x0 ][ y0 ][ 0 ][ 0 ] = 0
                    MvdCpL1[ x0 ][ y0 ][ 0 ][ 1 ] = 0
                    MvdCpL1[ x0 ][ y0 ][ 1 ][ 0 ] = 0
                    MvdCpL1[ x0 ][ y0 ][ 1 ][ 1 ] = 0
                    MvdCpL1[ x0 ][ y0 ][ 2 ][ 0 ] = 0
                    MvdCpL1[ x0 ][ y0 ][ 2 ][ 1 ] = 0
                } else {
                    if( sym_mvd_flag[ x0 ][ y0 ] ) {
                        MvdL1[ x0 ][ y0 ][ 0 ] = −MvdL0[ x0 ][ y0 ][ 0 ]
                        MvdL1[ x0 ][ y0 ][ 1 ] = −MvdL0[ x0 ][ y0 ][ 1 ]
                    } else
                        mvd_coding( x0, y0, 1, 0 )
                    if( MotionModelIdc[ x0 ][ y0 ] > 0 )
                        mvd_coding( x0, y0, 1, 1 )
                    if(MotionModelIdc[ x0 ][ y0 ] > 1 )
                        mvd_coding( x0, y0, 1, 2 )
                    mvp_l1_flag[ x0 ][ y0 ]                                     ae(v)
            <insert>} else {
                MvdL1[ x0 ][ y0 ][ 0 ] = 0
                MvdL1[ x0 ][ y0 ][ 1 ] = 0
            }<insertend>
                }
        } else {
```

Where in a slice header, the information regarding the number of active inter-layer pictures can be signaled as illustrated by example table 12 with syntax elements as described below:

TABLE 12

```
        if( ( slice_type != I && num_ref_entries[ 0 ][ RplsIdx[ 0 ] ] > 1)
            ( slice_type = = B && num_ref_entries[ 1 ][ RplsIdx[ 1 ] ] > 1 ) ) {
            num_ref_idx_active_override_flag                                    u(1)
            if( num_ref_idx_active_override_flag )
                for( i = 0; i < ( slice_type = = B ? 2: 1 ); i++ )
                    if( num_ref_entries[ i ][ RplsIdx[ i ] ] > 1 )
                        num_ref_idx_active_minus1[ i ]                          ue(v)
        }
        <insert>if( ( slice type != I &&
num_inter_layer_ref_entries[ 0 ][ RplsIdxf 0 ] ] > 1) | |
            ( slice type = = B && num_inter_layer_ref_entries[ 1 ][ RplsIdx[ 1 ] ] >
1 ))
            num_inter_layer_active_override_flag                                <insert>u
                                                                                (1)
```

TABLE 12-continued

| | |
|---|---|
| | <inserted> |
| if( num_inter_layer_active_override_flag ) <br>　for( i = 0; i < ( slice_type = = B ? 2: 1 ); i++ ) <br>　　if(num_inter_layer_ref_entries[ i ][ RplsIdx[ i ] ] > 1 ) <br>　　　num_inter_layer_ref_pics_minus1[ i ]<insertend> <br>} | <insert>u e(v)<inse rtend> |

<insert>num_inter_layer_active_override_flag equal to 1 specifies that the syntax element num_inter_layer_ref_pics_minus1[0] is present for P and B slices and that the syntax element num_inter_layer_ref_pics_minus1[1] is present for B slices. num_inter_layer_active_override_flag equal to 0 specifies that the syntax elements num_inter_layer_ref_pics_minus1[0] and num_inter_layer_ref_pics_minus1[1] are not present. When not present, the value of num_inter_layer_active_override_flag is inferred to be equal to 0.

num_inter_layer_ref_pics_minus1[i] is used for the derivation of the variable NumInterLayerActive[i]. The value of num_ref_idx_active_minus1[i] shall be in the range of 0 to num_inter_layer_ref_entries[i][RplsIdx[i] ].

The variable NumInterLayerActive[i] is derived as follows:

```
for( i = 0; i < 2; i++ )
    if( slice_type = = B ( slice_type = = P && i = = 0 ))
        NumInterLayerActive[ i ] =
        num_inter_layer_active_override_flag ?
    num_inter_layer_ref_pics_minus1[ i ] + 1 :
    num_inter_layer_ref_entries[ i ][ RplsIdx[ i ] ]<insertend>
```

In some examples, a spatial ID can be defined, similar to a temporal ID, that indicates spatial representations of pictures that may not be captured by nuh_layer_id. One of the purposes of signalling the nuh_layer_id in the NAL unit header is to easily identify NAL units that belong to a particular layer, which may be removed in cases of sub-bitstream extraction purposes. Easy identification of NAL units belonging to a particular layer provides benefits to the operation of a system, and hence the spatial_id is also considered to be signalled in the NAL unit header. For this purpose, the nuh_reserved_zero_bit can be renamed as layer_id_interpret_flag, and semantics can be modified as follows, or in some cases, a new syntax element spatial_id may also be sent.

When layer_id_interpret_flag is equal to 0, the syntax element nuh_layer_id_plus1 is interpreted as currently to specify the layer ID of the current picture.

When layer_id_interpret_flag is equal to 1, the syntax element nuh_layer_id_plus1 is interpreted to contain some bits indicating the layer ID and some bits specifying the spatial ID. For example, the first four bits may indicate the layer ID and the last three bits may indicate the spatial ID. In general, the in this case, the actual layer ID and the spatial ID maybe derived from the syntax element nuh_layer_id_plus1 using a predetermined method.

A difference between the spatial_id and the layer ID is that conformance of "single layer" decoders will also be involved in decoding of bitstreams containing multiple spatial_ids. The value of the spatial_id may be used to identify reference pictures in the "single-layer" coder without having to re-use the layer concept, and in this way the concept of layers would be clearly demarcated from temporal and spatial layers. For simplicity conformance may further be simplified so that simple decoders do not have to consider bitstreams with non-zero spatial_id: i.e., single layer bitstreams that only have single layer and one spatial ID conforming to one type (e.g., Main-Simple) and single-layer bitstreams that have single layer but may contain multiple spatial IDs (e.g., Main-Representation).

Within a single layer, pictures with multiple spatial ID values may be considered to be part of different spatial access units: picture with POC 0 with spatial_id equal to 0 belong to one spatial access unit, whereas the picture with POC 0 (in the same access unit) with spatial id equal to 1 belongs to another spatial access unit. The concept of spatial access unit may not necessarily have a different relation to the output time (similar to layer access units), but they are important in different representations within the CPB and the DPB. The output order may also be influenced by the spatial access units, when one or more spatial access units in a layer access unit is to be output. Pictures belonging to spatial_id may be dependent on other pictures with lower spatial_id; pictures belonging to a spatial ID S may not reference pictures belonging to the same layer that have spatial ID greater than S.

A maximum number of spatial layers may be specified for a bitstream, and the POC value for each picture may be derived as a function of the picture order count LSB (syntax element) and the spatial ID. For example, the POC of pictures across layers may be constrained to be the same; whereas POC of pictures in the same access unit within a layer but with different spatial IDs may not be the same. In some cases, this constraint may not be explicitly signalled, but rather derived in the decoder based on the pic_order_cnt_lsb and the spatial_id value.

Figure 4:
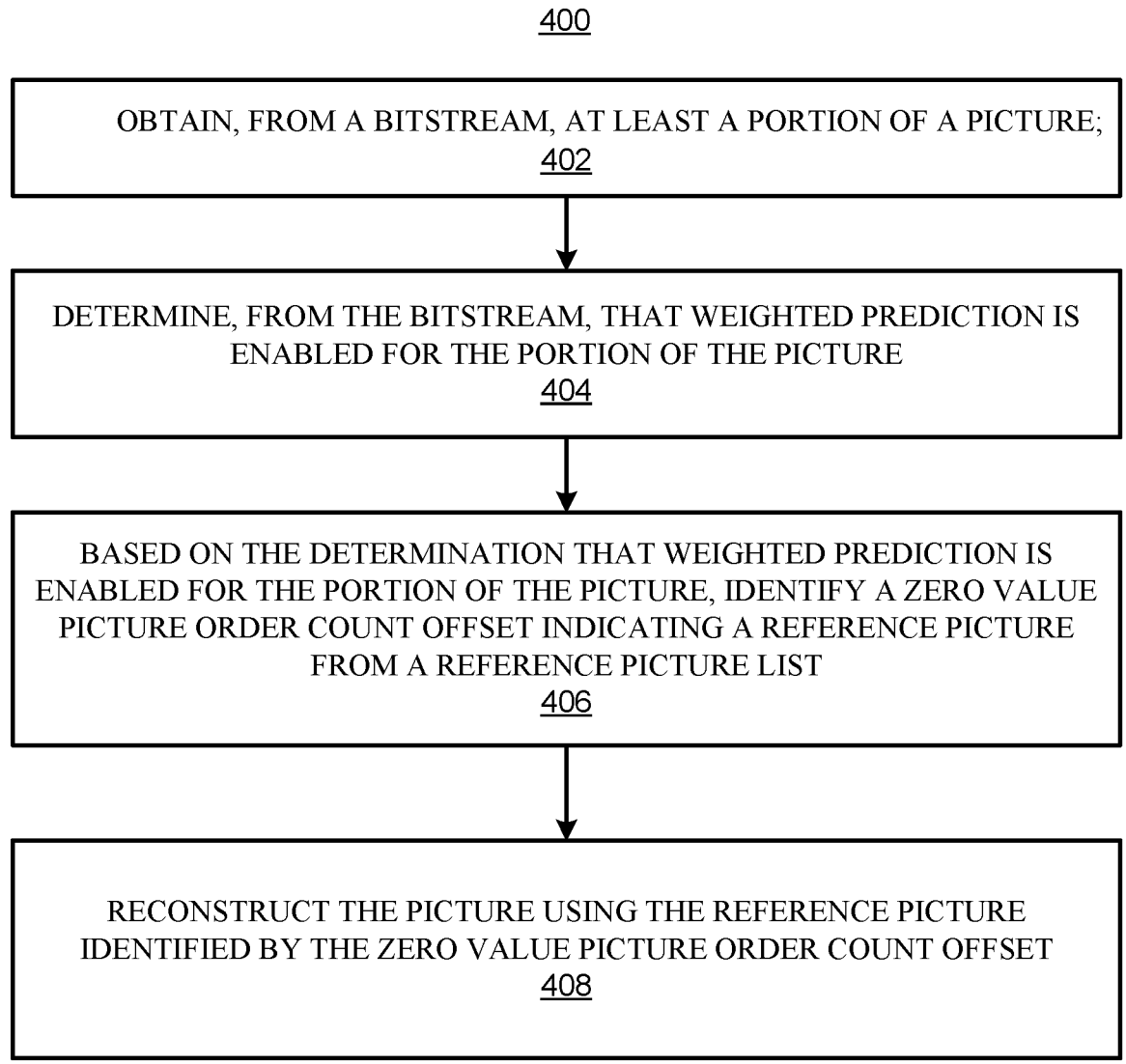
FIG. 4 is a flow diagram illustrating an example method in accordance with various examples described herein.

FIG. 4 is a flow diagram illustrating an example process 400 in accordance with some examples. In some examples, process 400 is performed by a decoding device (e.g., decoding device 112). In some examples, the process 400 can be performed by an encoding device (e.g., encoding device 104), such as when performing the decoding process for storing one or more reference pictures in a decoded picture buffer (DPB). In other examples, process 400 can be implemented as instructions in a non-transitory storage medium that cause a device to perform process 400 when processors of the device execute the instructions. In some cases, when the process 400 is performed by a video decoder, the video data can include a coded picture or a portion (e.g., one or more blocks) of the coded picture included in an encoded video bitstream or can include multiple coded pictures included in the encoded video bitstream.

At block 402, the process 400 obtains at least a portion of a picture from a bitstream. In some examples, this portion of the picture is a slice of the picture. As described herein, this can be a bitstream obtained by a mobile device such as a smartphone, a computer, any device with a screen, a television, or any device with decoding hardware.

At block 404, the process 400 determines, from the bitstream, that weighted prediction is enabled for the portion of the picture. The process 400 can determine that weighted prediction is enabled by parsing the bitstream for a flag indicating weighted prediction. As described herein, the parsing can be performed using an SPS flag and/or a PPS flag. In some cases, the PPS flag is constrained by the SPS flag. In some examples, the flag (e.g., the SPS flag and/or the PPS flag) can specify uni-directional predicted frames (e.g., P-frames) or bi-directional predictive frames (e.g., B-frames).

At block 406, based on the determination that weighted prediction is enabled for the portion of the picture, the process 400 identifies a zero value picture order count offset indicating a reference picture from a reference picture list. As described herein, the zero value picture order count offset can identify a reference picture from a table, and the reference picture can then be used for weighted prediction. The reference picture referenced by the zero value picture order count offset at block 404 for weighted prediction can be a version of the picture including the portion of the picture obtained at block 402, with the picture from block 402 having different weighted parameters than the reference picture indicated by the zero value picture order count offset (e.g., a copy of the picture from block 402 with different weights).

At block 408, the process 400 reconstructs at least the portion of the picture using at least a portion of the reference picture identified by the zero value picture order count offset. The reconstruction of the picture can be performed as part of reconstruction of the picture from the bitstream as part of a VVC compliant decoding operation, or can be part of any similar decoding operation. This process 400 can be repeated for additional portions of the picture or other pictures obtained from the bitstream. Different corresponding picture order count offsets for the plurality of portions of the picture are identified as part of the process. This process can further be repeated for any number of pictures, with some pictures using weighted prediction, and others having weighted prediction disabled. When weighted prediction is enabled, some reference pictures of a video will have an associated picture order count offset value that is zero, and other reference pictures will have non-zero values with frames from other access units are used for weighted prediction of a current frame. The associated pictures are then reconstructed as the process repeats for additional pictures.

In some examples, the additional frames identify flags indicating that weighted prediction is disabled. In some such embodiments, additional pictures or picture portions or picture slices can be processed with operations to parse syntax elements of the bitstream that indicate the plurality of corresponding picture order count offsets by reconstructing values of the syntax elements as a signaled value plus 1. In some such examples, an abs_delta_poc_st short-term reference picture syntax value specifies an absolute difference between a picture order count value of the second picture and a previous short-term reference picture entry in the reference picture list for a second reference picture as the abs_delta_poc_st short-term reference picture syntax value plus one when weighted prediction is disabled.

In some examples, both weighted prediction and inter-layer prediction can be applied to the portion of the picture, so that the reference picture has a different size than the picture, the reference picture is associated with a set of weights different than a second set of different weights associated with the picture (e.g., from block 402). In some such examples, the reference picture is signaled as a short-term reference picture with a picture order count least significant bit value equal to zero.

In some examples, the picture is a non-instantaneous decoding refresh (non-IDR) picture (e.g., the picture can include another type of picture or random access picture), as described above.

Figure 5:
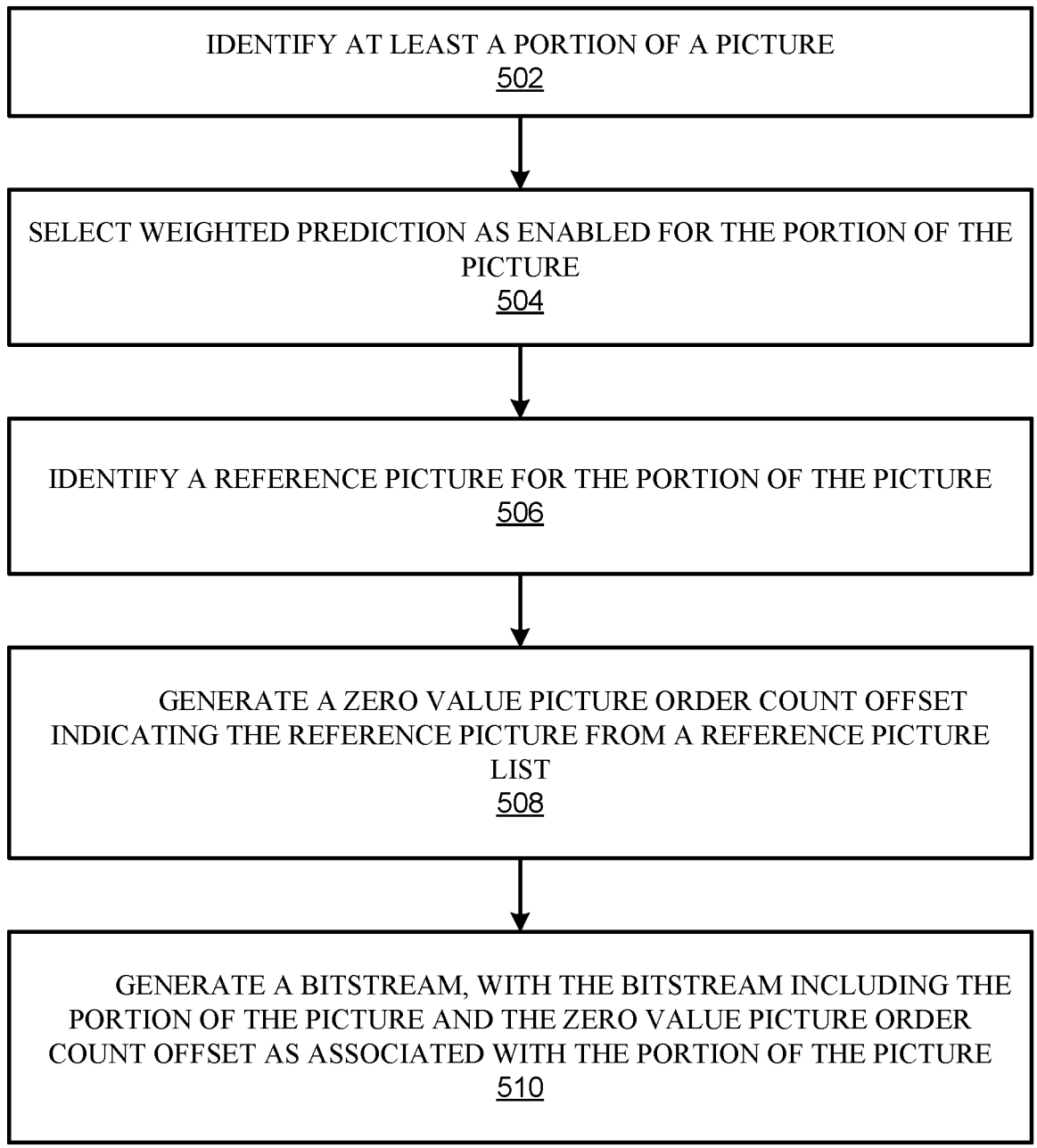
FIG. 5 is a flow diagram illustrating an example method in accordance with various examples described herein.

FIG. 5 is a flow diagram illustrating an example of a process 500 in accordance with some examples. In some examples, the process 500 is performed by an encoding device (e.g., encoding device 104). In other examples, the process 500 can be implemented as instructions in a non-transitory storage medium that cause a device to perform the process 500 when processors of the device execute the instructions. In some cases, when the process 500 is performed by a video encoder, the video data can include a picture or a portion (e.g., one or more blocks) of the picture to be encoded in an encoded video bitstream or can include multiple pictures to be encoded in the encoded video bitstream.

At block 502, the process 500 includes identifying at least a portion of a picture. At block 504, the process 500 includes selecting weighted prediction as enabled for the portion of the picture. At block 506, the process 500 includes identifying a reference picture for the portion of the picture. Identifying the reference picture can include selecting weights for various pictures as well as associating pictures with copies having different weights as reference pictures for the first picture.

At block 508, the process 500 includes generating a zero value picture order count offset indicating the reference picture from a reference picture list. At block 510, the process 500 includes generating a bitstream. The bitstream includes the portion of the picture and the zero value picture order count offset as associated with the portion of the picture.

Just as above for process 400, the process 500 can be implemented in a variety of devices. In some implementations, process 500 is performed by processing circuitry of a mobile device with a camera coupled to the processor and the memory for capturing and storing the at least one picture. In other examples, process 500 is performed by any device with a display coupled to a processor, with the display configured for displaying the at least one picture prior to the picture being processed and transmitted in a bitstream using process 400.

In some implementations, the processes (or methods) described herein (including processes 400 and 500) can be performed by a computing device or an apparatus, such as the system 100 shown in FIG. 1. For example, the processes can be performed by the encoding device 104 shown in FIG. 1 and FIG. 6, by another video source-side device or video transmission device, by the decoding device 112 shown in FIG. 1 and FIG. 7, and/or by another client-side device, such as a player device, a display, or any other client-side device. In some cases, the computing device or apparatus may include one or more input devices, one or more processors, one or more microprocessors, one or more microcomputers, and/or other component(s) of a device that are configured to carry out the steps of the processes described herein.

In some examples, the computing device or apparatus may include or be a mobile device, a desktop computer, a server computer and/or server system, or other type of computing device. The components of the computing device (e.g., the one or more input devices, one or more output devices, one or more processors, one or more microprocessors, one or more microcomputers, and/or other component(s)) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various examples of the application have been described. Specific details of the encoding device 104 and the decoding device 112 are shown in FIG. 6 and FIG. 7, respectively.

Figure 6:
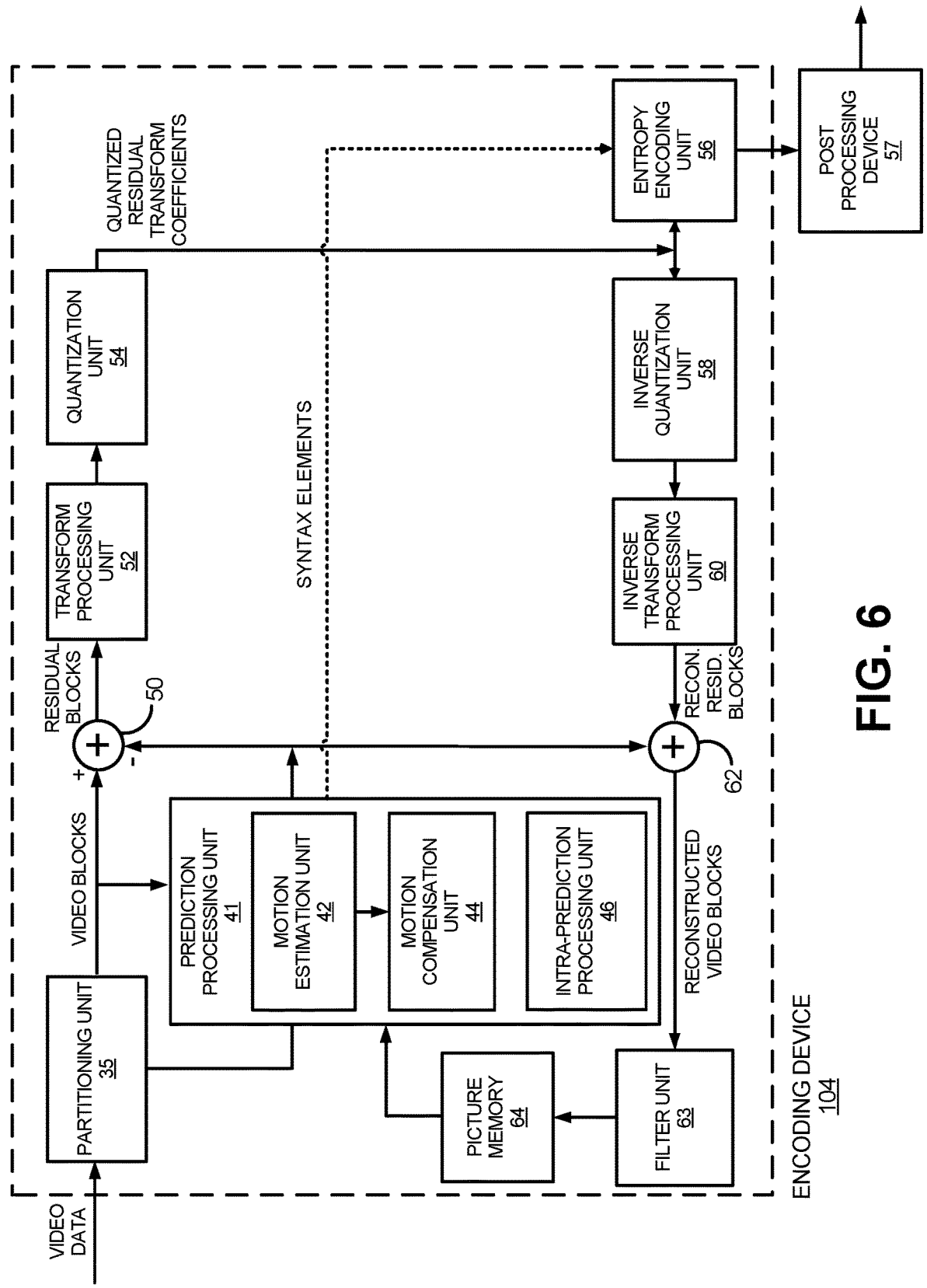
FIG. 6 is a block diagram illustrating an example video encoding device, in accordance with some examples.
Figure 7:
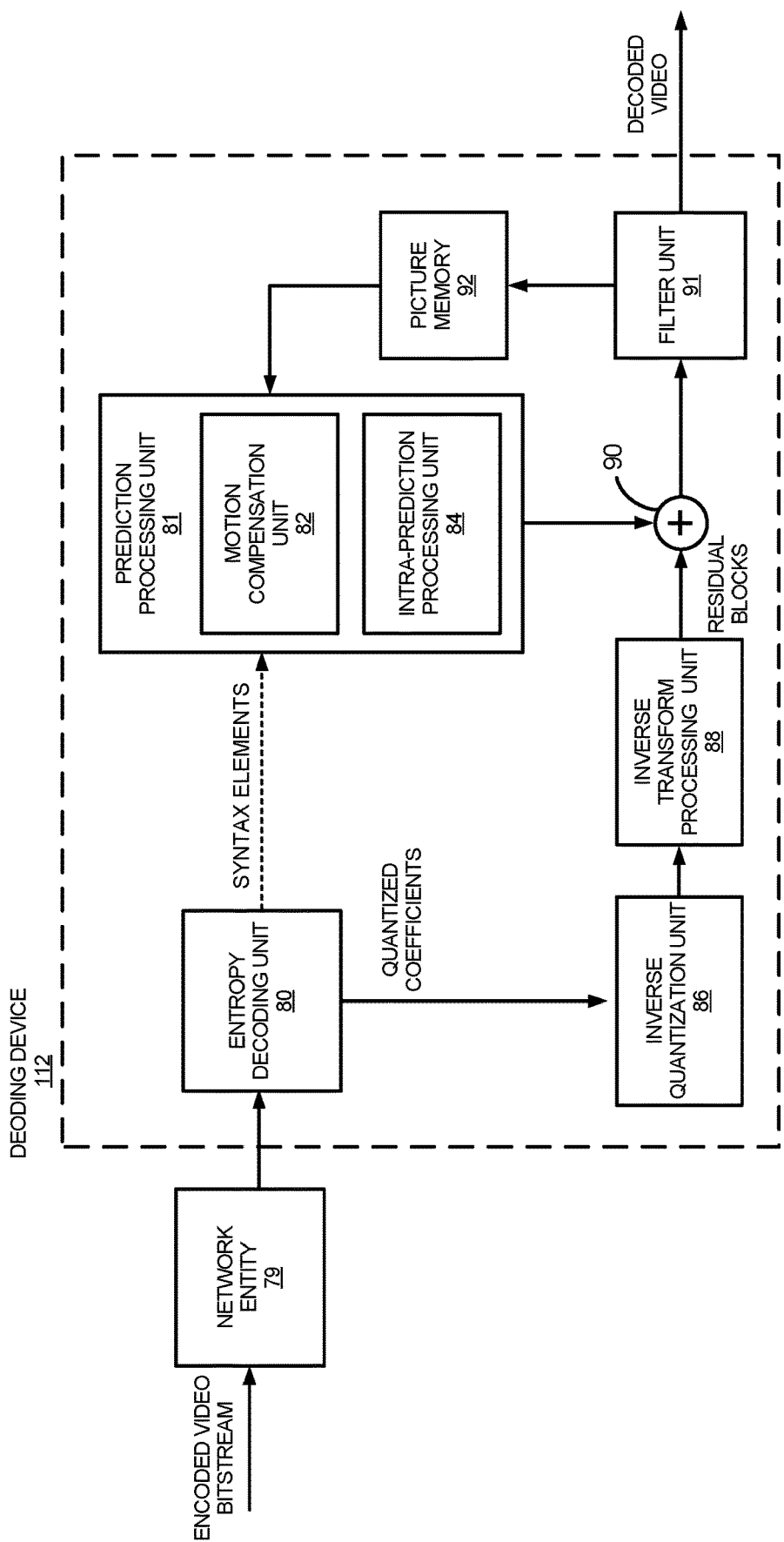
FIG. 7 is a block diagram illustrating an example video decoding device, in accordance with some examples.

Specific details of the encoding device 104 and the decoding device 112 are shown in FIG. 6 and FIG. 7, respectively. FIG. 6 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 6 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 6, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 can intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, (e.g., during separate encoding passes), and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 6 represents an example of a video encoder configured to perform one or more of the techniques described herein, including the processes described above with respect to FIG. 4 and FIG. 5. In some cases, some of the techniques of this disclosure may also be implemented by post processing device 57.

FIG. 7 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 6.

During the decoding process, the decoding device 112 receives an encoded video bitstream that represents video blocks of an encoded video slice and associated syntax elements sent by the encoding device 104. In some examples, the decoding device 112 may receive the encoded video bitstream from the encoding device 104. In some examples, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 7 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 7 represents an example of a video decoder configured to perform one or more of the techniques described herein, including the processes described above with respect to FIG. 3 and FIG. 4.

The filter unit 91 filters the reconstructed block (e.g., the output of summer 90) and stores the filtered reconstructed block in DPB 94 for uses as a reference block and/or outputs the filtered reconstructed block (decoded video). The reference block may be used by motion compensation unit 82 as a reference block to inter-predict a block in a subsequent video frame or picture. The filter unit 91 may perform any type of filtering such as deblocking filtering, SAO filtering, peak SAO filtering, ALF, and/or GALF, and/or other types of loop filters. A deblocking filter may, for example, apply deblocking filtering to filter block boundaries to remove blockiness artifacts from reconstructed video. A peak SAO filter may apply offsets to reconstructed pixel values in order to improve overall coding quality. Additional loop filters (in loop or post loop) may also be used.

In addition, the filter unit 91 may be configured to perform any of the techniques in this disclosure related to adaptive loop filtering. For example, as described above, filter unit 91 may be configured to determine parameters for filtering a current block based on parameters for filtering a previous block that were included in the same APS as the current block, a different APS, or pre-defined filters.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples and examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Example 1

A method of processing video data, the method comprising: obtaining video data including one or more pictures; and determining weighted prediction is disabled for at least a portion of the one or more pictures; and determining that having a same picture order count (POC) value for more than one reference picture is disallowed in response to determining weighted prediction is disabled for at least the portion of the one or more pictures.

Example 2

The method of example 1, wherein at least the portion of the one or more pictures includes a slice of a picture.

Example 3

The method of any one of examples 1 to 2, further comprising: obtaining a weighted prediction flag; and determining, based on the weighted prediction flag, that the weighted prediction is disabled for the one or more pictures.

Example 4

The method of example 3, wherein the weighted prediction flag indicates whether weighted prediction is applied to uni-directional predicted slices (P-slices).

Example 5

The method of example 3, wherein the weighted prediction flag indicates whether weighted prediction is applied to bi-directional predicted slices (B-slices).

Example 6

An apparatus comprising a memory configured to store video data and a processor configured to process the video data according to any of examples 1 to 5.

Example 7

The apparatus of example 6, wherein the apparatus includes an encoder.

Example 8

The apparatus of example 6, wherein the apparatus includes a decoder.

Example 9

The apparatus of any one of examples 6 to 8, wherein the apparatus is a mobile device.

Example 10

The apparatus of any one of examples 6 to 9, further comprising a display configured to display the video data.

Example 11

The apparatus of any one of examples 6 to 10, further comprising a camera configured to capture one or more pictures.

Example 12

A computer readable medium having stored thereon instructions that when executed by a processor perform the methods of any of examples 1 to 5.

Example 13

A method of processing video data, the method comprising: obtaining video data including a plurality of reference pictures in a plurality of layers; and generating a reference picture structure (RPS), the RPS including a picture order count (POC) value and a layer identifier (ID) for at least one reference picture of the plurality of reference pictures, wherein a layer ID for a reference picture identifies a layer of the reference picture.

Example 14

The method of example 13, further comprising generating the RPS to include a layer ID for each reference picture of the plurality of reference pictures.

Example 15

The method of example 13, further comprising generating the RPS to include a layer ID for a reference picture when a POC value of the reference picture is equal to a POC value of the current picture.

Example 16

An apparatus comprising a memory configured to store video data and a processor configured to process the video data according to any of examples 13 to 15.

Example 17

The apparatus of example 16, wherein the apparatus includes an encoder.

Example 18

The apparatus of any one of examples 16 to 17, wherein the apparatus is a mobile device.

Example 19

The apparatus of any one of examples 16 to 18, further comprising a display configured to display the video data.

Example 20

The apparatus of any one of examples 16 to 19, further comprising a camera configured to capture one or more pictures.

Example 21

The apparatus of any one of examples 16 to 20, further comprising communication circuitry configured to transmit processed video data.

Example 22

A computer readable medium having stored thereon instructions that when executed by a processor perform the methods of any of examples 13 to 15.

Example 23

A method of processing video data, the method comprising: obtaining video data including a plurality of reference pictures in a plurality of layers; and processing, from the video data, a reference picture structure (RPS), the RPS including a picture order count (POC) value and a layer identifier (ID) for at least one reference picture of the plurality of reference pictures, wherein a layer ID for a reference picture identifies a layer of the reference picture.

Example 24

The method of example 23, wherein the RPS includes a layer ID for each reference picture of the plurality of reference pictures.

Example 25

The method of example 23, wherein the RPS includes a layer ID for a reference picture when a POC value of the reference picture is equal to a POC value of the current picture.

Example 26

An apparatus comprising a memory configured to store video data and a processor configured to process the video data according to any of examples 23 to 25.

Example 27

The apparatus of example 26, wherein the apparatus includes a decoder.

Example 28

The apparatus of any one of examples 26 to 27, wherein the apparatus is a mobile device.

Example 29

The apparatus of any one of examples 26 to 28, further comprising a display configured to display the video data.

Example 30

The apparatus of any one of examples 26 to 29, further comprising a camera configured to capture one or more pictures.

Example 31

A computer readable medium having stored thereon instructions that when executed by a processor perform the methods of any of examples 23 to 25.

Example 32

A method of processing video data, the method comprising: obtaining video data including a plurality of pictures in a plurality of layers, the plurality of layers corresponding to a plurality of representations of video content; determining inter-layer prediction is enabled for the plurality of pictures; and inferring a zero-motion vector based on determining inter-layer prediction is enabled for the plurality of pictures, the zero-motion vector indicating there is no displacement of content in the plurality pictures of the plurality of representations.

Example 33

The method of example 33, wherein motion information is signaled in an encoded video bitstream including the plurality of pictures when the motion information is not used for the inter-layer prediction.

Example 34

An apparatus comprising a memory configured to store video data and a processor configured to process the video data according to any of examples 32 to 33.

Example 35

The apparatus of example 34, wherein the apparatus includes an encoder.

Example 36

The apparatus of example 34, wherein the apparatus includes a decoder.

Example 37

The apparatus of any one of examples 34 to 36, wherein the apparatus is a mobile device.

Example 38

The apparatus of any one of examples 34 to 37, further comprising a display configured to display the video data.

Example 39

The apparatus of any one of examples 34 to 38, further comprising a camera configured to capture one or more pictures.

Example 40

A computer readable medium having stored thereon instructions that when executed by a processor perform the methods of any of examples 32 to 33.

Example 41

A method of processing video data, the method comprising: obtaining video data; and generating, from the video data, an encoded video bitstream including one or more syntax elements and a plurality of pictures in a plurality of layers, the plurality of layers corresponding to a plurality of representations of video content, wherein a number of entries in an inter-layer reference picture entry syntax element is restricted not to exceed a maximum number of reference pictures minus a number of inter-prediction reference pictures.

Example 42

The method of example 41, wherein the inter-layer reference picture entry syntax element specifies a number of direct inter-layer reference picture entries in a reference picture list syntax structure.

Example 43

An apparatus comprising a memory configured to store video data and a processor configured to process the video data according to any of examples 41 to 42.

Example 44

The apparatus of example 43, wherein the apparatus includes an encoder.

Example 45

The apparatus of example 43, wherein the apparatus is a mobile device.

Example 46

The apparatus of any one of examples 43 to 45, further comprising a display configured to display the video data.

Example 47

The apparatus of any one of examples 43 to 46, further comprising a camera configured to capture one or more pictures.

Example 48

A computer readable medium having stored thereon instructions that when executed by a processor perform the methods of any of examples 41 to 42.

Example 49

A method of processing video data, the method comprising: obtaining an encoded video bitstream including one or more syntax elements and a plurality of pictures in a plurality of layers, the plurality of layers corresponding to a plurality of representations of video content; and processing, from the encoded video bitstream, an inter-layer reference picture entry syntax element, wherein a number of entries in the inter-layer reference picture entry syntax element is restricted not to exceed a maximum number of reference pictures minus a number of inter-prediction reference pictures.

Example 50

The method of example 33, wherein the inter-layer reference picture entry syntax element specifies a number of direct inter-layer reference picture entries in a reference picture list syntax structure.

Example 51

An apparatus comprising a memory configured to store video data and a processor configured to process the video data according to any of examples 49 to 50.

Example 52

The apparatus of example 51, wherein the apparatus includes a decoder.

Example 53

The apparatus of example 51, wherein the apparatus is a mobile device.

Example 54

An example apparatus of any one of examples 51 to 53, further comprising a display configured to display the video data.

Example 55

An example apparatus of any one of examples 51 to 54, further comprising a camera configured to capture one or more pictures.

Example 56

An example computer readable medium having stored thereon instructions that when executed by a processor perform the methods of any of examples 49 to 50.

Example 57

A method for decoding video data, the method comprising: obtaining, from a bitstream, at least a portion of a picture; determining, from the bitstream, that weighted prediction is enabled for the portion of the picture; based on the determination that weighted prediction is enabled for the portion of the picture, identifying a zero value picture order count offset indicating a reference picture from a reference picture list; and reconstructing at least the portion of the picture using at least a portion of the reference picture identified by the zero value picture order count offset.

Example 58

The method of example 57, further comprising: obtaining, from the bitstream, a plurality of portions of the picture, the plurality of portions including the at least the portion of the picture reconstructed using the reference picture identified by the zero value picture order count offset; identifying a plurality of corresponding picture order count offsets for the plurality of portions of the picture, wherein the zero value picture order count offset is a corresponding picture order count offset for the picture of the plurality of corresponding picture order count offsets; and reconstructing the picture using a plurality of reference pictures identified by the plurality of corresponding picture order count offsets.

Example 59

The method of example 57, further comprising, determining that weighted prediction is enabled by parsing the bitstream to identify one or more weighted prediction flags for the picture.

Example 60

The method of example 59, wherein the one or more weighted prediction flags for the picture comprise a sequence parameter set weighted prediction flag and a picture parameter set weighted prediction flag.

Example 61

The method of example 60, wherein the sequence parameter set weighted prediction flag and the picture parameter set weighted prediction flag are flags for uni-directional predicted frames.

Example 62

The method of example 60, wherein the sequence parameter set weighted prediction flag and the picture parameter set weighted prediction flag are flags for bi-directional predictive frames.

Example 63

The method of example 60, wherein the picture parameter set weighted prediction flag is constrained by the sequence parameter set weighted prediction flag. [ ]

Example 64

The method of example 57, further comprising: obtaining at least a portion a second picture included in the bitstream; determining, from the bitstream, that weighted prediction is disabled for the second picture; parsing a syntax element of the bitstream that indicates a picture order count offset for a second reference picture by reconstructing a value of the syntax element as a signaled value plus 1 based on the weighted prediction being disabled for the second picture; and reconstructing the second picture using the reconstructed value of the syntax element.

Example 65

The method of example 64, wherein a value of a reference picture syntax element specifies an absolute difference between a picture order count value of the second picture and a previous reference picture entry in the reference picture list for the second reference picture as value plus one when weighted prediction is disabled.

Example 66

The method of example 57, wherein the reference picture is associated with a first set of weights and the picture is associated with a second set of weights different than the first set of weights; wherein the reference picture has a different size than the picture; and wherein the reference picture is signaled as a short-term reference picture with a picture order count least significant bit value equal to zero.

Example 67

The method of example 57, wherein the picture is a non-instantaneous decoding refresh (non-IDR) picture.

Example 68

The method of example 57, wherein at least the portion of the picture is a slice.

Example 69

The method of example 57, further comprising: determining from the bitstream, a layer identifier for the reference picture indicating a layer of a layer index for inter-layer prediction; wherein the zero value picture order count offset is identified by inferring a zero value from a picture order count for the reference picture not being signaled when the layer identifier is different than a current layer identifier.

Example 70

An apparatus comprising a memory configured to store video data and a processor configured to process the video data according to any of examples 57 to 69.

Example 71

An apparatus for encoding video data, the apparatus comprising: a memory; and a processor implemented in circuitry and configured to: identify at least a portion of a picture; select weighted prediction as enabled for the portion of the picture; identify a reference picture for the portion of the picture; generate a zero value picture order count offset indicating the reference picture from a reference picture list; and generate a bitstream, the bitstream comprising the portion of the picture and the zero value picture order count offset as associated with the portion of the picture.

Example 72

A method for encoding video data, the method comprising: identifying at least a portion of a picture; determining that weighted prediction is selected as enabled for the portion of the picture; identifying a reference picture for the portion of the picture; generating a zero value picture order count offset indicating the reference picture from a reference picture list; and generating a bitstream, the bitstream comprising the portion of the picture and the zero value picture order count offset as associated with the portion of the picture.

What is claimed is:

1. An apparatus for decoding video data, the apparatus comprising:
   a memory; and
   a processor implemented in circuitry and configured to:
      obtain at least a portion of a picture included in a bitstream;
      determine, from the bitstream, that weighted prediction is enabled for at least the portion of the picture;
      based on the determination that weighted prediction is enabled for at least the portion of the picture, identify a zero value picture order count offset indicating a reference picture from a reference picture list; and
      reconstruct at least the portion of the picture using at least a portion of the reference picture identified by the zero value picture order count offset.

2. The apparatus of claim 1, wherein the processor is further configured to:
   obtain, from the bitstream, a plurality of portions of the picture, the plurality of portions including at least the portion of the picture reconstructed using the reference picture identified by the zero value picture order count offset;
   identify a plurality of corresponding picture order count offsets for the plurality of portions of the picture, wherein the zero value picture order count offset is a corresponding picture order count offset of the plurality of corresponding picture order count offsets associated with the reference picture; and
   reconstruct the picture using a plurality of reference pictures identified by the plurality of corresponding picture order count offsets.

3. The apparatus of claim 1, wherein the processor is further configured to determine that weighted prediction is enabled by parsing the bitstream to identify one or more weighted prediction flags for the picture.

4. The apparatus of claim 3, wherein the one or more weighted prediction flags for the portion of the picture comprises a sequence parameter set weighted prediction flag and a picture parameter set weighted prediction flag.

5. The apparatus of claim 4, wherein the sequence parameter set weighted prediction flag and the picture parameter set weighted prediction flag are flags for uni-directional predicted frames.

6. The apparatus of claim 4, wherein the sequence parameter set weighted prediction flag and the picture parameter set weighted prediction flag are flags for bi-directional predictive frames.

7. The apparatus of claim 4, wherein the picture parameter set weighted prediction flag is constrained by the sequence parameter set weighted prediction flag.

8. The apparatus of claim 1, wherein the processor is further configured to:
   obtain at least a portion of a second picture included in the bitstream;
   determine, from the bitstream, that weighted prediction is disabled for the portion of the second picture; and
   based on the determination that weighted prediction is disabled for the portion of the second picture, determine that a second zero value picture order count offset is not allowed as indicating a second reference picture from the reference picture list for the portion of the second picture.

9. The apparatus of claim 8, wherein the processor is further configured to:
   based on the determination that the second zero value picture order count offset is not allowed, parse a syntax element of the bitstream that indicates a picture order count offset for the second reference picture by generating a reconstructed value of the syntax element as a signaled value plus 1 based on the weighted prediction being disabled for the second picture; and
   reconstruct the second picture using the reconstructed value of the syntax element.

10. The apparatus of claim 8, wherein a value of a reference picture syntax element specifies an absolute difference between a picture order count value of the second picture and a previous reference picture entry in the reference picture list for the second reference picture as a signaled value plus one when weighted prediction is disabled.

11. The apparatus of claim 1, wherein the reference picture is associated with a first set of weights and the picture is associated with a second set of weights different than the first set of weights;
   wherein the reference picture has a different size than the picture; and
   wherein the reference picture is signaled as a short-term reference picture with a picture order count least significant bit value equal to zero.

12. The apparatus of claim 1, wherein the picture is a non-instantaneous decoding refresh (non-IDR) picture.

13. The apparatus of claim 1, wherein the processor is configured to:
   determine from the bitstream, a layer identifier for the reference picture indicating a layer of a layer index for inter-layer prediction; and
   wherein the zero value picture order count offset is identified by inferring a zero value from a picture order count for the reference picture not being signaled when the layer identifier is different than a current layer identifier.

14. The apparatus of claim 1, wherein the apparatus comprises a mobile device with a camera coupled to the processor and the memory for capturing and storing the picture.

15. The apparatus of claim 1, further comprising a display.

16. A method for decoding video data, the method comprising:
   obtaining, from a bitstream, at least a portion of a picture;
   determining, from the bitstream, that weighted prediction is enabled for the portion of the picture;
   based on the determination that weighted prediction is enabled for the portion of the picture, identifying a zero value picture order count offset indicating a reference picture from a reference picture list; and
   reconstructing at least the portion of the picture using at least a portion of the reference picture identified by the zero value picture order count offset.

17. The method of claim 16, further comprising:
   obtaining, from the bitstream, a plurality of portions of the picture, the plurality of portions including at least the portion of the picture reconstructed using the reference picture identified by the zero value picture order count offset;
   identifying a plurality of corresponding picture order count offsets for the plurality of portions of the picture, wherein the zero value picture order count offset is a corresponding picture order count offset for the picture of the plurality of corresponding picture order count offsets; and
   reconstructing the picture using a plurality of reference pictures identified by the plurality of corresponding picture order count offsets.

18. The method of claim 16, further comprising, determining that weighted prediction is enabled by parsing the bitstream to identify one or more weighted prediction flags for the picture.

19. The method of claim 18, wherein the one or more weighted prediction flags for the picture comprise a sequence parameter set weighted prediction flag and a picture parameter set weighted prediction flag.

20. The method of claim 19, wherein the sequence parameter set weighted prediction flag and the picture parameter set weighted prediction flag are flags for uni-directional predicted frames.

21. The method of claim 19, wherein the sequence parameter set weighted prediction flag and the picture parameter set weighted prediction flag are flags for bi-directional predictive frames.

22. The method of claim 19, wherein the picture parameter set weighted prediction flag is constrained by the sequence parameter set weighted prediction flag.

23. The method of claim 16, further comprising:
   obtaining at least a portion a second picture included in the bitstream;
   determining, from the bitstream, that weighted prediction is disabled for the second picture; and
   parsing a second syntax element of the bitstream that indicates a picture order count offset for a second reference picture by generating a reconstructed value of the second syntax element as a signaled value plus 1 based on the weighted prediction being disabled for the second picture.

24. The method of claim 23, further comprising:
   determining that the zero value picture order count offset is not allowed based on the parsing of the second syntax element; and
   reconstructing the second picture using the reconstructed value of the second syntax element.

25. The method of claim 23, wherein a value of a reference picture syntax element specifies an absolute difference between a picture order count value of the second picture and a previous reference picture entry in the reference picture list for the second reference picture as the signaled value plus one when weighted prediction is disabled.

26. The method of claim 16, wherein the reference picture is associated with a first set of weights and the picture is associated with a second set of weights different than the first set of weights;

wherein the reference picture has a different size than the picture; and wherein the reference picture is signaled as a short-term reference picture with a picture order count least significant bit value equal to zero.

27. The method of claim 16, wherein the picture is a non-instantaneous decoding refresh (non-IDR) picture.

28. The method of claim 16, wherein at least the portion of the picture is a slice.

29. The method of claim 16, further comprising:

determining from the bitstream, a layer identifier for the reference picture indicating a layer of a layer index for inter-layer prediction; and wherein the zero value picture order count offset is identified by inferring a zero value from a picture order count for the reference picture not being signaled when the layer identifier is different than a current layer identifier.

30. An apparatus for encoding video data, the apparatus comprising:

a memory; and a processor implemented in circuitry and configured to:
   identify at least a portion of a picture;
   select weighted prediction as enabled for the portion of the picture;
   identify a reference picture for the portion of the picture;
   generate a zero value picture order count offset indicating the reference picture from a reference picture list, based on the selection of weighted prediction as enabled; and
   generate a bitstream, the bitstream comprising the portion of the picture and the zero value picture order count offset as associated with the portion of the picture.

31. A method for encoding video data, the method comprising:

identifying at least a portion of a picture;
   determining that weighted prediction is selected as enabled for the portion of the picture;
   identifying a reference picture for the portion of the picture;
   generating a zero value picture order count offset indicating the reference picture from a reference picture list, based on determining that weighted prediction is selected as enabled; and
   generating a bitstream, the bitstream comprising the portion of the picture and the zero value picture order count offset as associated with the portion of the picture.

* * * * *